United States Patent
Pawluk et al.

(10) Patent No.: US 10,242,167 B2
(45) Date of Patent: Mar. 26, 2019

(54) METHOD FOR USER AUTHENTICATION AND ELECTRONIC DEVICE IMPLEMENTING THE SAME

(71) Applicant: SAMSUNG ELECTRONICS CO., LTD., Suwon-si (KR)

(72) Inventors: Michal Pawluk, Lesznowola (PL); Grzegorz Pawel Grzesiak, Warsaw (PL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 154 days.

(21) Appl. No.: 15/348,547

(22) Filed: Nov. 10, 2016

(65) Prior Publication Data

US 2017/0132399 A1 May 11, 2017

(30) Foreign Application Priority Data

Nov. 10, 2015 (KR) .................. 10-2015-0157726

(51) Int. Cl.
*G06F 21/31* (2013.01)
*G06F 3/01* (2006.01)
*G06F 3/03* (2006.01)
*G06F 3/0346* (2013.01)
*G06F 3/0484* (2013.01)
*G06F 3/0488* (2013.01)
*G06F 1/16* (2006.01)

(52) U.S. Cl.
CPC ............ *G06F 21/31* (2013.01); *G06F 1/1694* (2013.01); *G06F 3/013* (2013.01); *G06F 3/017* (2013.01); *G06F 3/0304* (2013.01); *G06F 3/0346* (2013.01); *G06F 3/04845* (2013.01); *G06F 3/04883* (2013.01)

(58) Field of Classification Search
CPC ........ G06F 21/31; G06F 3/017; G06F 1/1694; G06F 3/013; G06F 3/04883; G06F 3/04845; G06F 3/0304; G06F 3/0346; G06F 1/1894
See application file for complete search history.

(56) References Cited

U.S. PATENT DOCUMENTS

| | | | |
|---|---|---|---|
| 7,359,512 B1 * | 4/2008 | Elliott | H04L 9/0858 380/253 |
| 8,988,350 B2 * | 3/2015 | Karmarkar | G06F 3/013 345/158 |

(Continued)

OTHER PUBLICATIONS

Weaver et al., "Gaze-Based Password Authentication through Automatic Clustering of Gaze Points", 2011, IEEE, pp. 2749-2754. (Year: 2011).*

(Continued)

*Primary Examiner* — Matthew Smithers
(74) *Attorney, Agent, or Firm* — Sughrue Mion, PLLC

(57) ABSTRACT

A method for user authentication in an electronic device includes: detecting at least one rotation of the electronic device; obtaining at least one rotation angle based on the detected at least one rotation; obtaining at least one code based on the at least one rotation angle and a user authentication angle, the user authentication angle being obtained from a user gaze point that is set, and storing the at least one code as an authentication code; and unlocking the electronic device in response to an input of a code matching the authentication code.

18 Claims, 34 Drawing Sheets

(56) References Cited

U.S. PATENT DOCUMENTS

| | | | |
|---|---|---|---|
| 9,256,715 B2* | 2/2016 | Draluk | G06F 21/00 |
| 9,280,652 B1* | 3/2016 | Bozarth | G06F 21/36 |
| 2010/0125816 A1* | 5/2010 | Bezos | G06F 1/1626 |
| | | | 715/863 |
| 2012/0260311 A1* | 10/2012 | Kang | G06F 3/0346 |
| | | | 726/3 |
| 2013/0342672 A1* | 12/2013 | Gray | G06F 3/013 |
| | | | 348/78 |
| 2014/0025957 A1* | 1/2014 | Chen | H04L 63/083 |
| | | | 713/184 |
| 2016/0226865 A1* | 8/2016 | Chen | G06F 21/31 |
| 2017/0006028 A1* | 1/2017 | Tunnell | H04L 63/0861 |
| 2018/0144192 A1* | 5/2018 | Kim | G06K 9/00604 |

OTHER PUBLICATIONS

Kratz et al., "Protractor3D: A Closed-Form Solution to Rotation-Invariant 3D Gestures", Feb. 2011, ACM, pp. 371-374. (Year: 2011).*

* cited by examiner

METHOD FOR USER AUTHENTICATION AND ELECTRONIC DEVICE IMPLEMENTING THE SAME

CROSS-REFERENCE TO RELATED APPLICATION

This application claims priority from Korean Patent Application No. 10-2015-0157726, filed on Nov. 10, 2015, the disclosure of which is hereby incorporated herein in its entirety by reference.

BACKGROUND

1. Field

Methods and apparatuses consistent with exemplary embodiments relate to a method for user authentication and an electronic device implementing the same.

2. Description of the Prior Art

With the development of digital technology in recent years, various mobile user devices that enable communications and personal information processing, such as Personal Digital Assistants (PDA), electronic notebooks, smartphones, and tablet Personal Computers (PC), have been released. These user devices may have diverse functions, such as voice calling, sending messages including Short Message Services (SMS)/Multimedia Message Services (MMS), video calling, an electronic notebook, photographing, sending and receiving emails, playing a broadcast, playing a video, Internet, electronic commerce, playing music, scheduling, Social Networking Services (SNS), messengers, dictionaries, and games.

Meanwhile, a security function is provided to prevent the user device from being used by unauthorized users without permission. A lock screen is provided as a security function, and a user uses a preset password input, pattern recognition, gesture recognition, and fingerprint and retina recognition on the lock screen to unlock the user device.

However, the conventional technology involves several problems. For example, it is difficult to store a user authentication procedure for unlocking a confidential lock function. In particular, password input, pattern recognition, and gesture recognition techniques may be easily exposed to a third person.

Further, when using fingerprint and retina recognition techniques, an electronic device needs to include a separate fingerprint recognizer or high-resolution camera, and these instruments are expensive and involve high-degree calculations to analyze fingerprint or retina characteristics.

One or more exemplary embodiments provide a user authentication method in which a user gaze point, which is not seen by a third person, is selected and a user authentication procedure is performed based on the selected user gaze point to provide high-level security during the user authentication procedure, and an electronic device implementing the same.

According to an aspect of an exemplary embodiment, a method for user authentication in an electronic device includes detecting at least one rotation of the electronic device; obtaining at least one rotation angle based on the detected at least one rotation; obtaining at least one code based on the at least one rotation angle and a user authentication angle, the user authentication angle being obtained from a user gaze point that is set, and storing the at least one code as an authentication code; and unlocking the electronic device in response to an input of a code matching the authentication code.

A user authentication method and an electronic device implementing the same according to various embodiments may use an unseen user gaze point, thereby protecting a user authentication procedure.

A user authentication method and an electronic device implementing the same according to various embodiments may not need to install hardware devices other than a general camera to protect a user authentication procedure.

A user authentication method and an electronic device implementing the same according to various embodiments do not need an advanced calculation device and may not need to increase available memory of the electronic device to protect a user authentication procedure.

A user authentication method and an electronic device implementing the same according to various embodiments do not involve a long time to authenticate a user.

BRIEF DESCRIPTION OF THE DRAWINGS

The above and/or other aspects will be more apparent by describing certain exemplary embodiments with reference to the accompanying drawings, in which.

DETAILED DESCRIPTION

Figure 1:
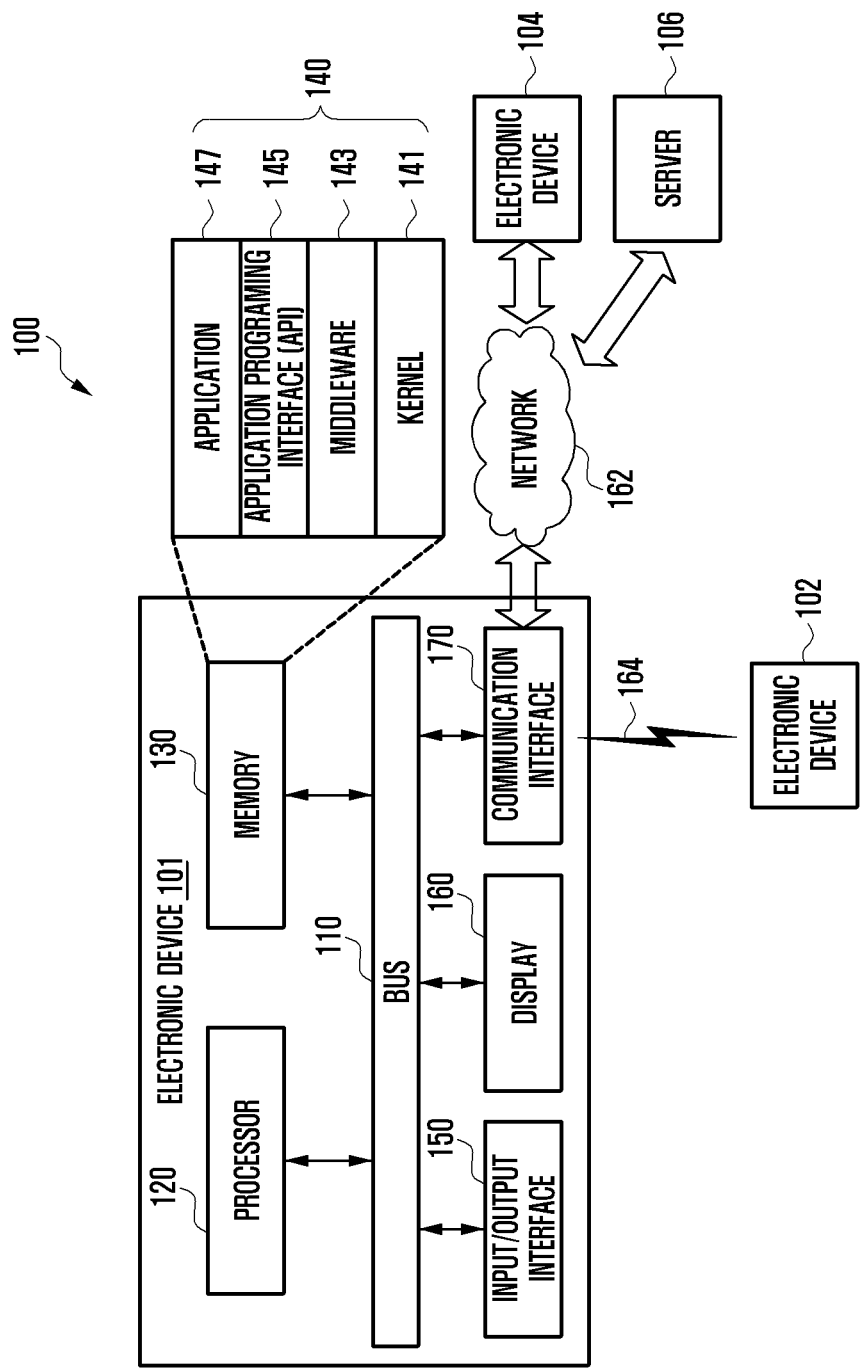
FIG. 1 illustrates an electronic device in a network environment according to various embodiments.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the spirit and scope of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only, and not for the purpose of limiting the disclosure as defined by the appended claims and their equivalents.

It is to be understood that the singular forms "a", "an", and "the", include plural referents unless the context clearly dictates otherwise. Thus, for example, reference to "a component surface" includes reference to one or more of such surfaces.

The expressions such as "include" and "may include" which may be used in the disclosure denote the presence of the disclosed functions, operations, and constituent elements, and do not limit one or more additional functions, operations, and constituent elements. In the disclosure, the terms such as "include" and/or "have", may be construed to denote a certain characteristic, number, operation, constituent element, component or a combination thereof, but should not be construed to exclude the existence of or a possibility of the addition of one or more other characteristics, numbers, operations, constituent elements, components or combinations thereof.

In the disclosure, the expression "and/or" includes any and all combinations of the associated listed words. For example, the expression "A and/or B" may include A, may include B, or may include both A and B.

In the disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first user device and a second user device indicate different user devices, although both are user devices. For further example, a first element could be termed a second element, and similarly, a second element could also be termed a first element without departing from the scope of the disclosure.

In the case where a component is referred to as being "connected" or "accessed" to another component, it should be understood that not only is the component connected or accessed to the other component, but also another component may exist between the component and the other component. In the case where a component is referred to as being "directly connected" or "directly accessed" to another component, it should be understood that there is no component therebetween.

Unless otherwise defined, all terms including technical and/or scientific terms used herein have the same meaning as commonly understood by one of ordinary skill in the art to which the disclosure pertains. In addition, unless otherwise defined, all terms defined in generally used dictionaries may not be overly interpreted.

The electronic device corresponds to at least one of a smartphone, a tablet personal computer (PC), a mobile phone, a video phone, an e-book reader, a desktop PC, a laptop PC, a netbook computer, a personal digital assistant (PDA), a portable multimedia player (PMP), a digital audio player (e.g., Moving Picture Experts Group phase 1 or phase 2 (MPEG-1 or MPEG-2) audio layer 3 (MP3) player), a mobile medical device, a camera, or a wearable device. Examples of the wearable device include a head-mounted-device (HMD) (e.g., electronic eyeglasses), electronic clothing, an electronic bracelet, an electronic necklace, an appcessory, an electronic tattoo, a smart watch, and the like.

The electronic device according to various embodiments of the disclosure may also be smart home appliances. Examples of the smart home appliances include a television (TV), a digital versatile disc (DVD) player, an audio system, a refrigerator, an air-conditioner, a cleaning device, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, an electronic album, or the like.

The electronic device according to various embodiments of the disclosure may also include medical devices (e.g., magnetic resonance angiography (MRA), magnetic resonance imaging (MRI), computed tomography (CT), a scanning machine, an ultrasonic scanning device, and the like), a navigation device, a global positioning system (GPS) receiver, an event data recorder (EDR), a flight data recorder (FDR), a vehicle infotainment device, an electronic equipment for ships (e.g., navigation equipment, gyrocompass, and the like), avionics, a security device, a head unit for vehicles, an industrial or home robot, an automatic teller's machine (ATM), a point of sales (POS) system, and the like.

The electronic device according to various embodiments of the disclosure may also include furniture or a portion of a building/structure, an electronic board, an electronic signature receiving device, a projector, various measuring instruments (e.g., a water meter, an electric meter, a gas meter and a wave meter) and the like. The electronic device according to various embodiments of the disclosure may also include a combination of the devices listed above. In addition, the electronic device according to various embodiments of the disclosure may be a flexible and/or contoured device. It should be obvious to those skilled in the art that the electronic device according to various embodiments of the disclosure is not limited to the aforementioned devices.

Hereinafter, electronic devices according to various embodiments of the disclosure will be described in detail with reference to the accompanying drawings. In the description, the term a 'user' may refer to a person or a device that uses or otherwise controls the electronic device, e.g., an artificial intelligent electronic device.

FIG. 1 illustrates a network environment including an electronic device according to an embodiment of the disclosure.

Referring to FIG. 1, an electronic device 101 of a network environment 100 may include a bus 110, a processor 120, a memory 130, an input/output (I/O) interface 140, a display 150 and a communication interface 160.

The bus 110 may be a communication circuit that connects the components to each other and transfers data (e.g., control messages) between the components.

The processor 120 may receive instructions from the components (e.g., the memory 130, I/O interface 140, display 150 and communication interface 160) via the bus 110, decode the instructions and perform corresponding operations or data processing according to the decoded instructions.

The memory 130 may store instructions or data transferred from/created in the processor 120 or the other components (e.g., I/O interface 140, display 150 and communication interface 160). The memory 130 may include programming modules, e.g., a kernel 131, a middleware 132, an application programming interface (API) 133, and an application module 134. Each of the programming modules may be software, firmware, hardware or a combination thereof.

The kernel 131 may control or manage system resources (e.g., the bus 110, processor 120, and memory 130) used to execute operations or functions of the programming modules, e.g., the middleware 132, API 133, and application module 134. The kernel 131 may also provide an interface that can access and control/manage the components of the electronic device 101 via the middleware 132, API 133, and application module 134.

The middleware 132 may make it possible for the API 133 or application module 134 to perform data communication with the kernel 131. The middleware 132 may also perform control operations (e.g., scheduling and load balancing) for task requests transmitted from the application module 134 using, for example, a method for assigning the order of priority to use the system resources (e.g., the bus 110, processor 120, and memory 130) of the electronic device 101 to at least one of the applications of the application module 134.

The API 133 is an interface that allows the application module 134 to control functions of the kernel 131 or middleware 132. For example, the API 133 may include at least one interface or function (e.g., instruction) for file control, window control, character control, video process, and the like.

In various embodiments of the disclosure, the application module 134 may include applications that are related to short message service (SMS)/multimedia messaging service (MMS), email, calendar, alarm, health care (e.g., an application for measuring blood sugar level, a workout application, and the like), and environment information (e.g., atmospheric pressure, humidity, temperature, and the like). The application module 134 may be an application related to exchanging information between the electronic device 101 and the external electronic devices (e.g., an electronic device 104). The information exchange-related application may include a notification relay application for transmitting specific information to an external electronic device or a device management application for managing external electronic devices.

For example, the notification relay application may include a function for transmitting notification information, created by the other applications of the electronic device 101 (e.g., SMS/MMS application, email application, health care application, environment information application, and the like), to an external electronic device (e.g., electronic device 104). In addition, the notification relay application may receive notification information from an external electronic device (e.g., electronic device 104) and provide it to the user. The device management application can manage (e.g., install, delete, or update) part of the functions of an external electronic device (e.g., electronic device 104) communicating with the electronic device 101, e.g., turning on/off the external electronic device, turning on/off part of the components of the external electronic device, adjusting the brightness or the display resolution of the display of the external electronic device, and the like, applications operated in the external electronic device, or services from the external electronic device, e.g., call service or messaging service, and the like.

In various embodiments of the disclosure, the application module 134 may also include applications designated according to attributes (e.g., type of electronic device) of the external electronic device (e.g., electronic device 104). For example, if the external electronic device is an MP3 player, the application module 134 may include an application related to music playback. If the external electronic device is a mobile medical device, the application module 134 may include an application related to health care. In an embodiment of the disclosure, the application module 134 may include an application designated in the electronic device 101 and applications transmitted from external electronic devices (e.g., server 106, electronic device 104, and the like).

The I/O interface 140 may receive instructions or data from the user via an I/O system (e.g., a sensor, keyboard or touch screen) and transfers them to the processor 120, memory 130 or communication interface 160 through the bus 110. For example, the I/O interface 140 may provide data corresponding to a user's touch input to a touch screen to the processor 120. The I/O interface 140 may receive instructions or data from the processor 120, memory 130 or communication interface 160 through the bus 110, and output them to an I/O system (e.g., a speaker or a display). For example, the I/O interface 140 may output voice data processed by the processor 120 to a speaker.

The display 150 may display information (e.g., multimedia data, text data, and the like) on a screen so that the user can view it.

The communication interface 160 may communicate between the electronic device 101 and an external system (e.g., an electronic device 104 or server 106). For example, the communication interface 160 may connect to a network 162 in a wireless or wired mode, and communicate with the external system. Wireless communication may include Wi-Fi, Bluetooth (BT), near field communication (NFC), GPS or cellular communication (e.g., long term evolution (LTE), LTE-advanced (LTE-A), code division multiple access (CDMA), wideband CDMA (WCDMA), universal mobile telecommunications system (UMTS), wireless broadband (Wi-Bro), global system for mobile communications (GSM), and the like). In addition, the wireless communication may include, for example, short range communication 164. Wired communication may include universal serial bus (USB), high definition multimedia interface (HDMI), recommended standard 232 (RS-232), plain old telephone service (POTS), and the like.

In an embodiment of the disclosure, the network 162 may be a telecommunication network. The telecommunication network may include a computer network, Internet, Internet of things (IoT), telephone network, and the like. The protocol for communication between the electronic device 101 and the external system, e.g., transport layer protocol, data link layer protocol, or physical layer protocol, may be supported by at least one of the application module 134, API 133, middleware 132, kernel 131 and communication interface 160.

Figure 2:
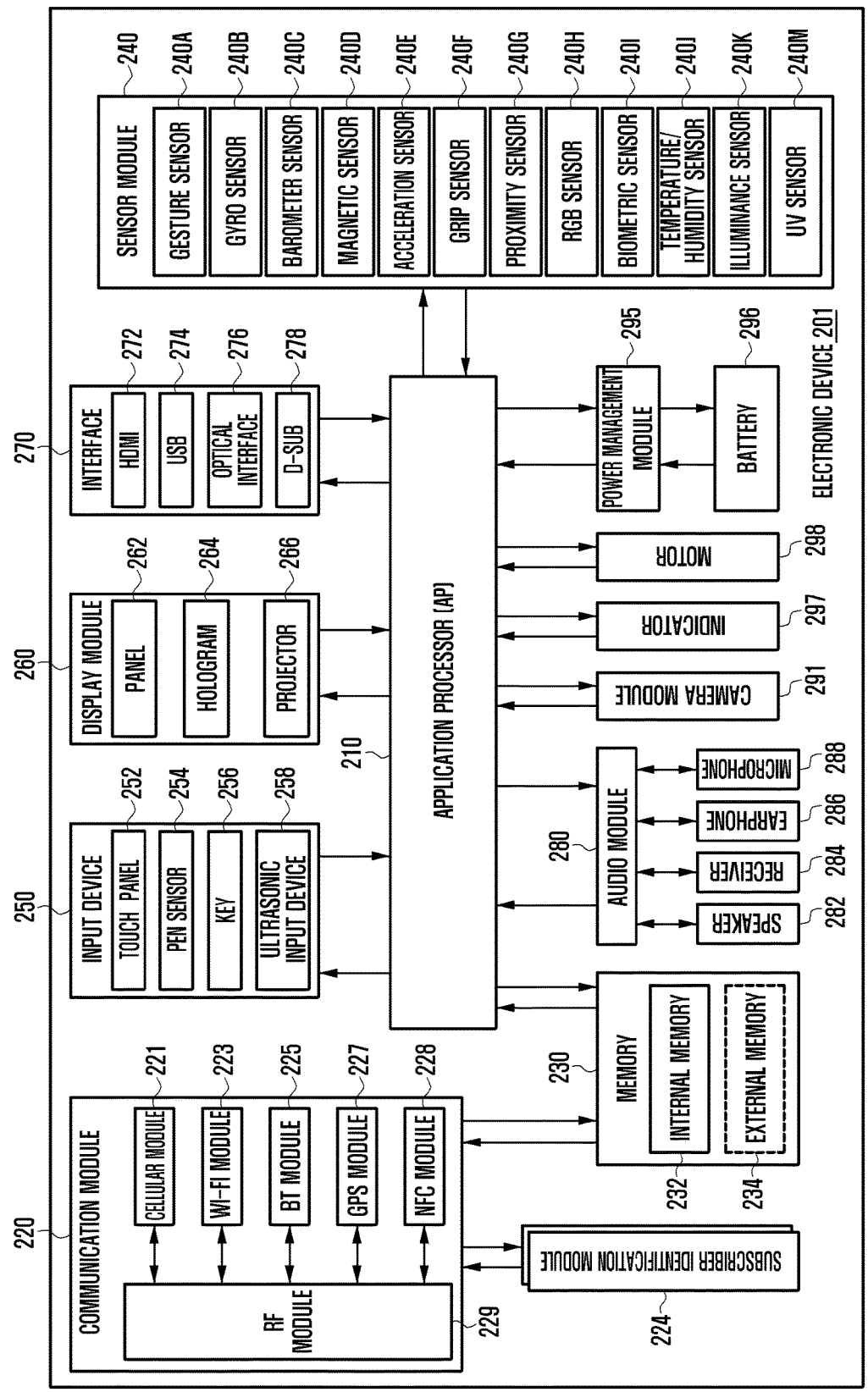
FIG. 2 is a block diagram of an electronic device according to various embodiments.

FIG. 2 illustrates a block diagram of an electronic device according to an embodiment of the disclosure.

Referring to FIG. 2, an electronic device 201 may be all or part of the electronic device 101 as shown in FIG. 1, and may include one or more processors of an application processor (AP) 210, a communication module 220, a subscriber identification module (SIM) card 224, a memory 230, a sensor module 240, an input device 250, a display module 260, an interface 270, an audio module 280, a camera module 291, a power management module 295, a battery 296, an indicator 297, and a motor 298.

The AP 210 may control a number of hardware or software components connected thereto by executing the operation system or applications, process data including multimedia data, and perform corresponding operations. The AP 210 may be implemented with a system on chip (SoC). In an embodiment of the disclosure, the AP 210 may further include a graphics processing unit (GPU).

The communication module 220 (e.g., communication interface 160) performs communication for data transmission/reception between the other electronic devices (e.g., an electronic device 102 or 104, and server 106) that are connected to the electronic device (e.g., electronic device 101) via the network. In an embodiment of the disclosure, the communication module 220 may include a cellular module 221, a Wi-Fi module 223, a BT module 225, a GPS module 227, an NFC module 228 and a radio frequency (RF) module 229.

The cellular module 221 may provide voice call, video call, SMS or Internet service, and the like, via a communication network (e.g., LTE, LTE-A, CDMA, WCDMA, UMTS, Wi-Bro, GSM, and the like). The cellular module 221 may also perform identification or authentication for electronic devices in a communication network by using their SIM (e.g., SIM card 224). In an embodiment of the disclosure, the cellular module 221 may perform part of the functions of the AP 210. For example, the cellular module 221 may perform part of the functions for controlling multimedia.

In an embodiment of the disclosure, the cellular module 221 may include a communication processor (CP). The cellular module 221 may be implemented with, for example, an SoC. Although the embodiment of the disclosure shown in FIG. 2 is implemented in such a way that the cellular module 221 (e.g., CP), the power management module 295, the memory 230, and the like, are separated from the AP 210, an embodiment can be modified in such a way that the AP 210 includes at least part of the listed elements or other elements of the device 201 (e.g., cellular module 221).

In an embodiment of the disclosure, the AP 210 or the cellular module 221 (e.g., CP) may load instructions or data transmitted to and from at least one of a non-volatile memory or other components, on a volatile memory and then process them. The AP 210 or the cellular module 221 may also store data which is transmitted from/created in at least one of the components, in a non-volatile memory.

The Wi-Fi module 223, the BT module 225, the GPS module 227 and the NFC module 228 may include processors for processing transmission/reception of data, respectively. Although the embodiment of the disclosure shown in FIG. 2 is implemented in such a way that the cellular module 221, Wi-Fi module 223, BT module 225, GPS module 227, and NFC module 228 are separated from each other, an embodiment can be modified in such a way that parts of the elements (e.g., two or more) are included in an integrated chip (IC) or an IC package. For example, part of the processors corresponding to the cellular module 221, Wi-Fi module 223, BT module 225, GPS module 227, and NFC module 228, e.g., a CP corresponding to the cellular module 221 and a Wi-Fi processor corresponding to the Wi-Fi 223, may be implemented with a SoC.

The RF module 229 may transmit or receive data, e.g., RF signals. The RF module 229 may include a transceiver, a power amplifier module (PAM), a frequency filter, a low noise amplifier (LNA), and the like. The RF module 229 may also include parts for transmitting/receiving electromagnetic waves, e.g., conductors, wires, and the like, via free space during wireless communication. Although the embodiment of the disclosure shown in FIG. 2 is implemented in such a way that the cellular module 221, Wi-Fi module 223, BT module 225, GPS module 227, and NFC module 228 share the RF module 229, an embodiment can be modified in such a way that at least one of the elements transmit or receive RF signals via a separate RF module.

The SIM card 224 may be a card with a SIM. The SIM card 224 may be fitted into a slot of the electronic device. The SIM card 224 may include unique identification information, e.g., integrated circuit card identifier (ICCID), or subscriber information, e.g., international mobile subscriber identity (IMSI).

The memory 230 (e.g., memory 130) may include built-in or internal memory 232 and/or external memory 234. The internal memory 232 may include at least one of a volatile memory, e.g., dynamic random access memory (DRAM), static RAM (SRAM), synchronous dynamic RAM (SDRAM), and the like, non-volatile memory, e.g., one time programmable read only memory (OTPROM), programmable ROM (PROM), erasable and programmable ROM (EPROM), electrically erasable and programmable ROM (EEPROM), mask ROM, flash ROM, NAND flash memory, NOR flash memory, and the like.

In an embodiment of the disclosure, the internal memory 232 may be a solid state drive (SSD). The external memory 234 may further include a flash drive, e.g., compact flash (CF), secure digital (SD), micro-SD, mini-SD, extreme digital (XD), a memory stick, and the like. The external memory 234 may be functionally connected to the electronic device via various types of interfaces. In an embodiment of the disclosure, the electronic device 101 may further include storage devices or storage media such as hard drives.

The sensor module 240 may measure a physical quantity or sense operation states of the electronic device 201 and convert the measured or sensed data into electrical signals. The sensor module 240 may include at least one of a gesture sensor 240A, a gyro sensor 240B, an atmospheric pressure (barometer) sensor 240C, a magnetic sensor 240D, an acceleration sensor 240E, a grip sensor 240F, a proximity sensor 240G, a color sensor 240H (e.g., a red-green-blue (RGB) sensor), a biosensor (biometric sensor) 240I, a temperature/humidity sensor 240J, an illuminance sensor 240K, and an ultra-violet (UV) sensor 240M.

The sensor module 240 may also include an e-nose sensor, electromyography (EMG) sensor, an electroencephalogram (EEG) sensor, an electrocardiogram (ECG) sensor, an infrared (IR) sensor, a fingerprint sensor, an iris sensor, and the like. The sensor module 240 may further include a control circuit for controlling the one or more sensors.

The input device 250 may include a touch panel 252, a pen sensor 254 (e.g., a digital pen sensor), a key 256 and an ultrasonic input device 258. The touch panel 252 may sense touches using a capacitive sensing mode, a pressure sensing mode, an infrared sensing mode, and an ultrasonic sensing mode. The touch panel 252 may further include a control circuit. When the touch panel 252 is designed to operate in a capacitive sensing mode, the panel can also sense mechanical/physical touches or proximity of an object. The touch panel 252 may further include a tactile layer. In that case, the touch panel 252 can also provide tactile feedback to the user.

The pen sensor 254 (e.g., digital pen sensor) may be detected in a same or similar way as receiving a user's touch input or by using a separate recognition sheet. The key 256 may include mechanical buttons, optical keys or a key pad. The ultrasonic input device 258 is a device that can sense sounds via a microphone 288 of the electronic device 201 by using an input tool for generating ultrasonic signals, and then receiving and checking data associated with the signals.

The ultrasonic input device 258 can sense signals in a wireless mode. In an embodiment of the disclosure, the electronic device 201 may also receive a user's inputs from an external system (e.g., a computer or server) via the communication module 220.

The display module 260 (e.g., display 150) may include a panel 262, a hologram unit 264, or a projector 266. The panel 262 may be implemented with a liquid crystal display (LCD), active matrix organic light emitting diodes (AMOLEDs), or the like. The panel 262 may be implemented in a flexible, transparent, impact-resistant, and/or wearable form. The panel 262 may form a single module with the touch panel 252. The hologram unit 264 shows a three-dimensional image in the air using interference of light. The projector 266 may display images by projecting light on a screen. The screen may be placed, for example, inside or outside of the electronic device 201. In an embodiment of the disclosure, the display module 260 may further include a control circuit for controlling the panel 262, the hologram unit 264, or the projector 266.

The interface 270 may include a HDMI 272, a USB 274, an optical interface 276, a D-subminiature (D-sub) 278, and the like. The interface 270 may also be included in the communication interface 160 shown in FIG. 1. The interface 270 may also include a mobile high-definition link (MHL) interface, an SD card, a multi-media card (MMC) interface, an infrared data association (IrDA) standard interface, or the like.

The audio module 280 may provide conversions between audio and electrical signals. At least part of the components in the audio module 280 may be included in the I/O interface 140 shown in FIG. 1. The audio module 280 may process audio output from/input to, for example, a speaker 282, a receiver 284, earphones 286, the microphone 288, and the like.

The camera module 291 may take still images or moving images. In an embodiment of the disclosure, the camera module 291 may include one or more image sensors (e.g., on the front side and/or the back side), a lens, an image signal processor (ISP), a flash (e.g., an LED or a xenon lamp), or the like.

The power management module 295 may manage electric power supplied to the electronic device 201. The power management module 295 may include a power management integrated circuit (PMIC), a charger IC, a battery or fuel gauge, and the like.

The PMIC may be implemented in the form of an IC chip or SoC. Charging electric power may be performed in wired and/or wireless modes. The charger IC may charge a battery, and prevent input over-voltage or input over-current to the battery from a charger. In an embodiment of the disclosure, the charger IC may be implemented with a wired charging type and/or a wireless charging type. Examples of the wireless charging type of the charger IC are a magnetic resonance type, a magnetic induction type, an electromagnetic type, an acoustic type, and the like. If the charger IC is implemented with a wireless charging type, it may also include an additional circuit for wireless charging, e.g., a coil loop, a resonance circuit, a rectifier, and the like.

The battery gauge may measure a residual amount of the battery 296, a level of voltage, a level of current, a temperature during the charge, and the like. The battery 296 stores electric power and supplies it to the electronic device 201. The battery 296 may include a rechargeable battery or a solar battery.

The indicator 297 shows states of the electronic device 201 or of the parts thereof (e.g., the AP 210), e.g., a booting state, a message state, a recharging state, and the like. The motor 298 converts an electrical signal into a mechanical vibration. Although not shown, the electronic device 201 may include a processor for supporting a mobile TV, e.g., a GPU. The mobile TV supporting processor may process media data that complies with standards of digital multimedia broadcasting (DMB), digital video broadcasting (DVB), media flow, and the like.

Each of the elements/units of the electronic device according to the disclosure may be implemented with one or more components, and may be called different names according to types of electronic devices. The electronic device according to the disclosure may include at least one element described above. The electronic device may also be modified in such a way as to remove part of the elements or include new elements. In addition, the electronic device according to the disclosure may also be modified in such a way that parts of the elements are integrated into one entity that performs their original functions.

In the disclosure, the terminology 'module' refers to a 'unit' including hardware, software, firmware or a combination thereof. For example, the terminology 'module' is interchangeable with 'unit,' 'logic,' 'logical block,' 'component,' 'circuit,' and the like. A 'module' may be the least identifiable unit or part of an integrated component. A 'module' may also be the least unit or part thereof that can perform one or more functions of the module. A 'module' may be implemented through mechanical or electronic modes. For example, 'modules' according to various embodiments of the disclosure may be implemented with at least one of an application specific integrated circuit (ASIC) chip, a field-programmable gate array (FPGAs) and a programmable-logic device that can perform functions that are known or will be developed.

An electronic device according to various embodiments of the disclosure may also include a communication module including a BT module for communicating with external devices, a display module for displaying data of an external device selected from the external devices, and an AP for selecting an external device having transmitted data corresponding to a signal among data received from the external devices, wherein the AP transmits signals to the external devices, receives data for the signals from the external devices, selects one of the external devices based on the received data, and transmits an operation execution signal to the selected external device.

An electronic device according to various embodiments of the disclosure may also include a communication module for communicating with the external devices, a display module for displaying data of an external device selected from the external devices, and an AP for selecting an external device having transmitted data corresponding to a signal among data received from the external devices, wherein the AP transmits signals to the external devices, receives data for the signals from the external devices, selects one of the external devices based on the received data, and transmits an operation execution signal to the selected external device.

An electronic device according to various embodiments of the disclosure may also include a display module for displaying data received from an external device, a communication module for communicating with the electronic device or the external device, a sensor module for measuring a sensor value corresponding to a data request signal received from the electronic device, and an AP for selecting an external device to transmit data corresponding to a signal transmitted from the electronic device among the data received from the external device, wherein the AP receives the signal from the electronic device, transmits the data corresponding to the signal to the electronic device, receives an operation execution signal for the data from the electronic device, and performs at least one of various operations according to the operation execution signal.

Figure 3:
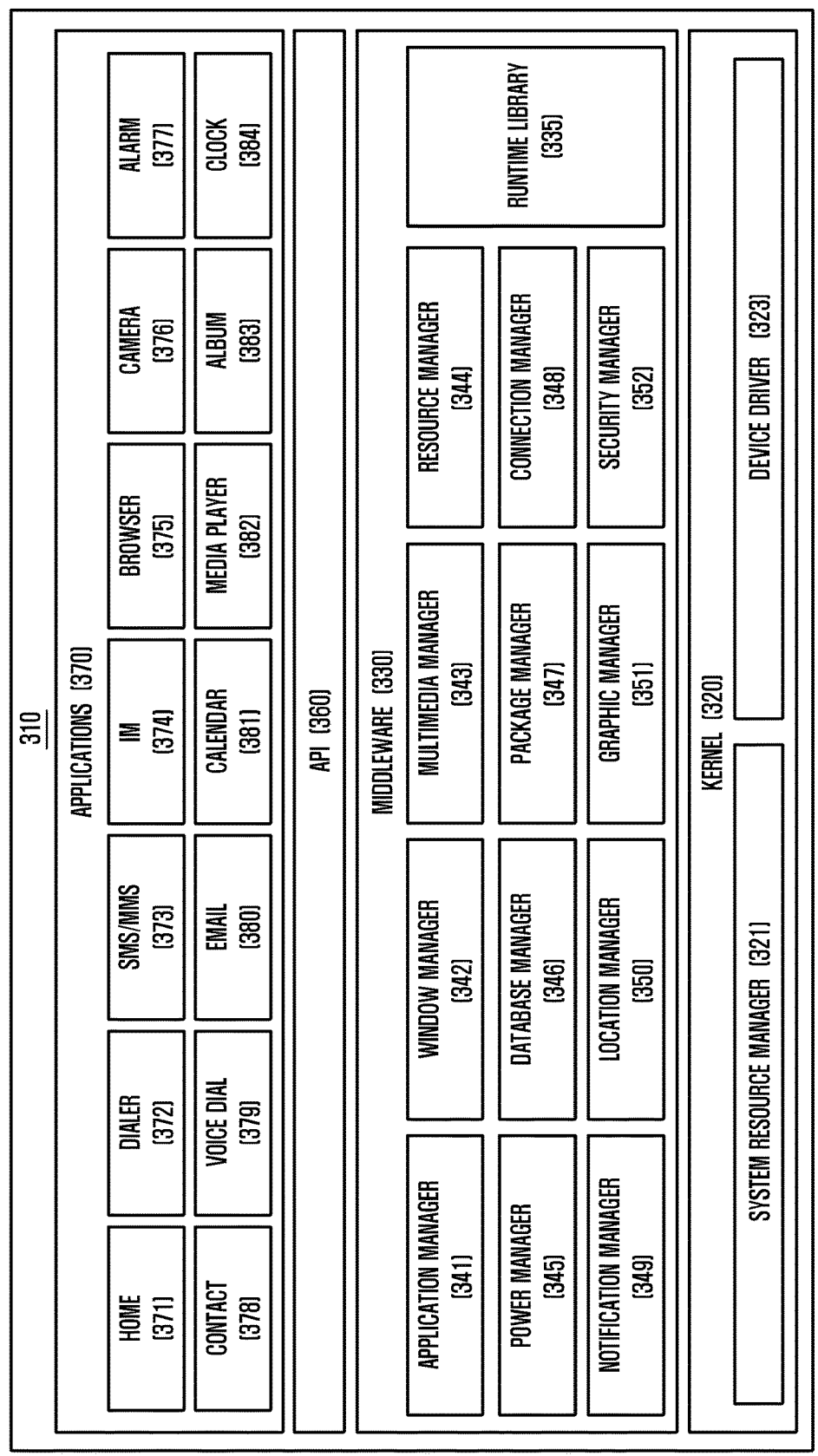
FIG. 3 is a block diagram of a program module according to various embodiments.

FIG. 3 is a block diagram of a program module according to various embodiments of the disclosure.

Referring to FIG. 3, a program module 300 may include an OS for controlling resources related to the electronic device and/or various applications executed in the operating system. The OS may be, for example, Android, iOS, Windows, Symbian, Tizen, Bada, or the like.

The program module 300 includes a kernel 310, middleware 330, an API 360, and/or applications 370. At least some of the program module 300 may be preloaded on an electronic device, or may be downloaded from an external electronic device (e.g., the electronic device 102 or 104, or the server 106).

The kernel 310 may include, for example, a system resource manager 311 and/or a device driver 312. The system resource manager 311 may perform control, allocation, retrieval, or the like, of system resources. According to an embodiment, the system resource manager 311 may include a process manager, memory manager, file system manager, or the like. The device driver 312 may include, for example, a display driver, camera driver, BT driver, shared memory driver, USB driver, keypad driver, Wi-Fi driver, audio driver, or inter-process communication (IPC) driver.

The middleware 330 may provide a function required by the applications 370 in common, or provide various functions to the applications 370 through the API 360 so that the applications 370 can efficiently use limited system resources within the electronic device. According to an embodiment of the disclosure, the middleware 330 may include, for example, at least one of a runtime library 335, an application manager 341, a window manager 342, a multimedia manager 343, a resource manager 344, a power manager 345, a database manager 346, a package manager 347, a connectivity (connection) manager 348, a notification manager 349, a location manager 350, a graphic manager 351, and a security manager 352.

The runtime library 335 may include a library module which a compiler uses to add a new function through a programming language while the applications 370 are being executed. The runtime library 335 may perform I/O management, memory management, functionality for an arithmetic function, or the like.

The application manager 341 may manage, for example, a life cycle of at least one of the applications 370. The window manager 342 may manage graphical user interface (GUI) resources used for the screen. The multimedia manager 343 may determine a format required to reproduce various media files, and may encode or decode a media file by using a coder/decoder (codec) appropriate for the corresponding format. The resource manager 344 may manage resources such as a source code, memory, and storage space of at least one of the applications 370.

The power manager 345 may operate together with a basic input/output system (BIOS) to manage a battery or other power, and may provide power information required for the operation of the electronic device. The database manager 346 may generate, search for, and/or change a database to be used by at least one of the applications 370. The package manager 347 may manage the installation or update of an application distributed in the form of a package file.

The connectivity manager 348 may manage a wireless connection such as, for example, Wi-Fi or BT. The notification manager 349 may display or notify of an event, such as an arrival message, appointment, proximity notification, and the like, in such a manner as not to disturb the user. The location manager 350 may manage location information of the electronic device. The graphic manager 351 may manage a graphic effect, which is to be provided to the user, or a user interface related to the graphic effect. The security manager 352 may provide various security functions required for system security, user authentication, and the like. According to an embodiment of the disclosure, when the electronic device has a telephone call function, the middleware 330 may further include a telephony manager for managing a voice call function or a video call function of the electronic device.

The middleware 330 may include a middleware module that forms a combination of various functions of the above-described elements. The middleware 330 may provide a module specialized for each type of OS to provide a differentiated function. Also, the middleware 330 may dynamically delete some of the existing elements, or may add new elements as required.

The API 360 is, for example, a set of API programming functions, and may be provided with a different configuration according to an OS. For example, in the case of Android or iOS, one API set may be provided for each platform. In the case of Tizen, two or more API sets may be provided for each platform.

The applications 370 may include, for example, one or more applications which can provide functions such as home 371, dialer 372, SMS/MMS 373, instant message (IM) 374, browser 375, camera 376, alarm 377, contacts 378, voice dialer 379, email 380, calendar 381, media player 382, album 383, clock 384, health care (e.g., measure exercise quantity or blood sugar), or environment information (e.g., atmospheric pressure, humidity, or temperature information).

According to an embodiment of the disclosure, the applications 370 may include an application (hereinafter, referred to as an "information exchange application" for convenience of the description) supporting information exchange between the electronic device and an external electronic device (e.g., the electronic device 102 or 104). The information exchange application may include, for example, a notification relay application for transferring specific information to an external electronic device or a device management application for managing an external electronic device.

For example, the notification relay application may include a function of transferring, to the external electronic device (e.g., the electronic device 102 or 104), notification information generated from other applications of the electronic device 101 (e.g., an SMS/MMS application, e-mail application, health management application, or environmental information application). Further, the notification relay application may receive notification information from, for example, an external electronic device and provide the received notification information to a user.

The device management application may manage (e.g., install, delete, or update), for example, at least one function of an external electronic device (e.g., the electronic device 102 or 104) communicating with the electronic device (e.g., a function of turning on/off the external electronic device or some components thereof, or a function of adjusting luminance or a resolution of the display), applications operating in the external electronic device, or services provided by the external electronic device (e.g., a call service and a message service).

According to an embodiment of the disclosure, the applications 370 may include an application (e.g., a health care application of a mobile medical device or the like) designated according to an attribute of the external electronic device (e.g., the electronic device 102 or 104). According to an embodiment, the applications 370 may include an application received from the external electronic device (e.g., the server 106, or the electronic device 102 or 104). According to an embodiment of the disclosure, the applications 370 may include a preloaded application or a third party application which can be downloaded from the server. Names of the elements of the program module 300, according to the above-described embodiments of the disclosure, may change depending on the type of OS.

An electronic device according to various embodiments may include: a camera configured to recognize a gaze of a user; a sensor unit configured to detect at least one rotation of the electronic device; a storage unit configured to store a code or code set calculated (or obtained) based on a user authentication angle calculated from a user gaze point and at least one rotation angle; and a processor configured to calculate at least one rotation angle based on the at least one detected rotation, to calculate at least one code based on the at least one calculated rotation angle and a user authentication angle calculated from a user gaze point that is set and to store the calculated code as an authentication code, and to unlock the electronic device when a code matching the stored authentication code is input.

According to various embodiments, the processor may determine, if an authentication code is pre-stored, that the at least one code matches the pre-stored authentication code, and unlock the electronic device if it is determined that the at least one code matches the pre-stored authentication code According to various embodiments, the processor may recognize a point at which a user gazes and may set the recognized point as the user gaze point.

According to various embodiments, the processor may calculate respective rotation angles based on a plurality of detected rotations when the plurality of rotations is detected, may calculate codes based on the respective calculated rotation angles and the user authentication angle, may generate and store a code set of the calculated codes, and may unlock the electronic device when a code set matching the stored code set is input.

According to various embodiments, the processor may generate and store a code set of the calculated codes in an order that the rotation angles are calculated.

According to various embodiments, the processor may additionally set a user gaze point whenever a plurality of rotations is detected.

According to various embodiments, the processor may calculate codes based on respective rotation angles based on the plurality of detected rotations and user authentication angles calculated from respective user gaze points additionally set according to the rotations, and may generate and store a code set of the codes.

According to various embodiments, the processor may generate and store a code set of the calculated codes in an order that the rotation angles are calculated.

According to various embodiments, the electronic device may further include a display configured to display to a graphic gauge to indicate a rotation direction and a rotation angle of the electronic device.

According to various embodiments, the processor may detect at least one rotation by recognizing at least one of a touch and a drag to rotate the graphic gauge.

In a computer-readable recoding medium that records a program to implement a user authentication method of an electronic device according to various embodiments, the method may include detecting at least one rotation of the electronic device, calculating at least one rotation angle based on the at least one detected rotation, calculating and storing at least one code based on the at least one calculated rotation angle and a user authentication angle calculated from a user gaze point that is set, and unlocking the electronic device when a code matching the stored at least one code is input.

Figure 4:
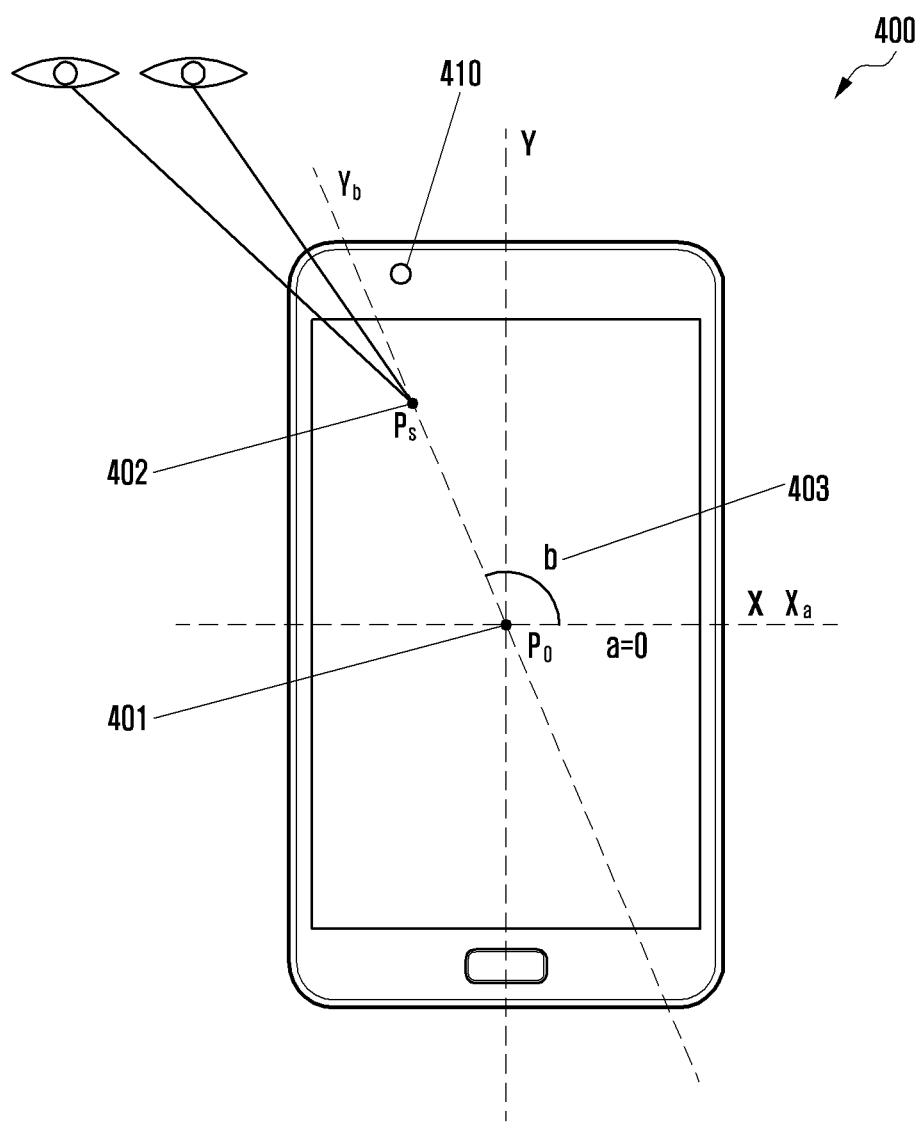
FIG. 4 illustrates that a user gaze point is set according to various embodiments.
Figure 5:
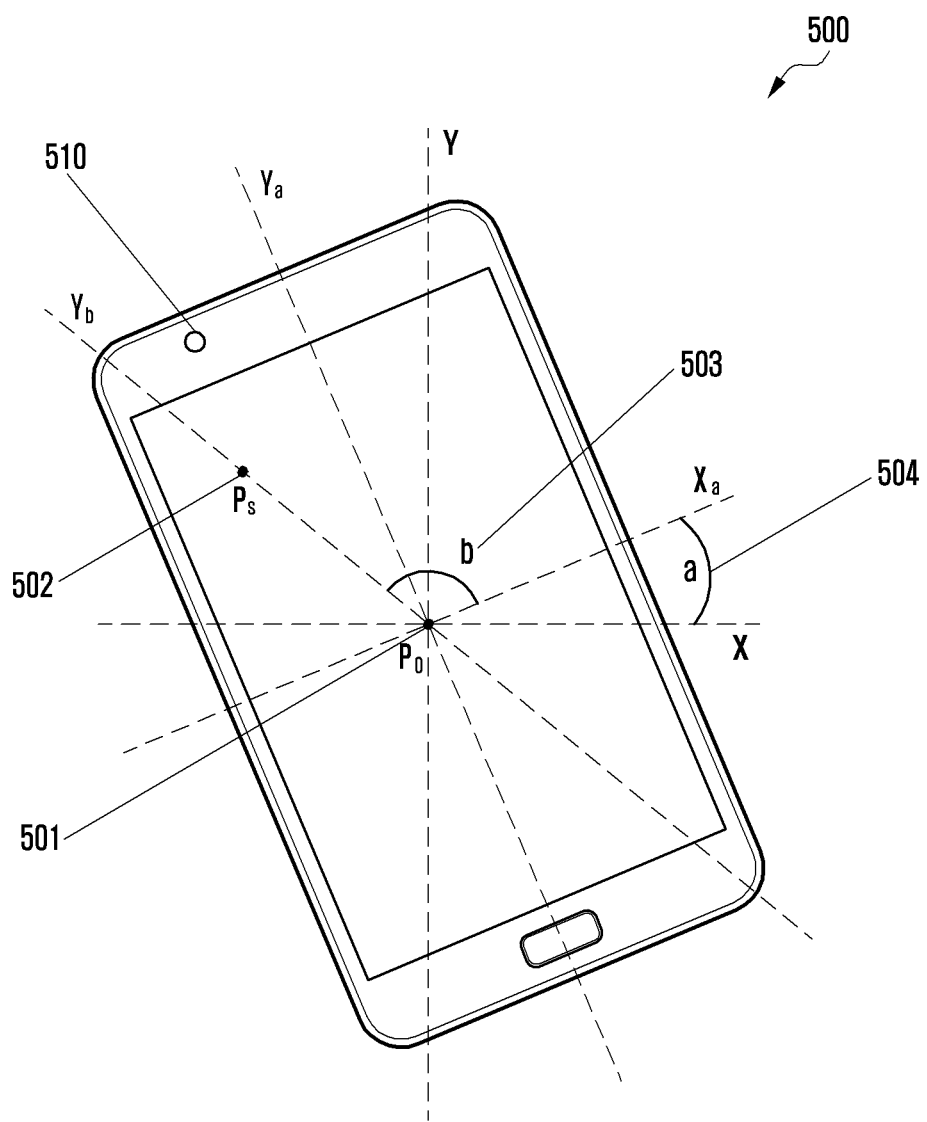
FIG. 5 illustrates that an electronic device is rotated according to various embodiments.

FIG. 4 illustrates that a user gaze point is set according to various embodiments. FIG. 5 illustrates that an electronic device is rotated according to various embodiments.

Before describing FIG. 4, the rotation of an electronic device may include a rotation based on a random axis of the electronic device. In an exemplary embodiment, for example, a rotation in one planar space on an axis (hereinafter, Z axis) perpendicular to the front side of the electronic device, that is, a side on which a screen and a front camera are disposed, is illustrated as one example.

Referring to FIG. 4, an electronic device 400 may detect a rotation on the Z axis, that is an axis perpendicular to Po, as the center of a plane on which the screen and the front camera 410 of the electronic device 400 are disposed. Further, the X axis may include a horizontal axis that passes through Po 401 as the center point of the electronic device 400 and is perpendicular to the Z axis. The Y axis may include a vertical axis that passes through Po 401 as the center point of the electronic device 400 and is perpendicular to the Z axis. The X axis, Y axis, and Z axis of the electronic device may be set by a user.

The electronic device 400 may set a user gaze point Ps 402 by tracking a user's point of gaze. A user gaze point is an algorithm that is well known in the field of image processing technology, and thus a detailed description thereof is omitted.

Referring to FIG. 4, when the user gaze point Ps 402 is set by the user, the electronic device 400 may measure a user authentication angle counterclockwise from an Xa axis to a Yb axis corresponding to the user gaze point Ps 402. The user authentication angle may be represented by b 403.

Xa may denote the X-axis rotated by a rotation angle of a, and Yb may denote the Y-axis rotated by an angle of a. In FIG. 4, since the electronic device 400 is not rotated, the rotation angle of a is 0, and thus the X axis and Y axis do not change and the Xa axis indicates the X axis.

According to various embodiments, a rotation angle that is an angle based on a rotation and a user authentication angle based on a selection of a user gaze point Ps may have integer values.

In one embodiment, the electronic device may determine that the rotation angle is a positive value or a negative value depending on a rotation direction of the electronic device. FIG. 5 illustrates that an electronic device 500 is rotated counterclockwise, in which a rotation angle of a 504 may be expressed as a positive value.

In one embodiment, the electronic device may measure the user authentication angle based on the selection of the user gaze point Ps counterclockwise from the X axis of Quadrant I and may store the measured value that is expressed as a positive number. Alternatively, the electronic device may measure the user authentication angle based on the selection of the user gaze point Ps clockwise from the X axis of Quadrant I and may store the measured value that is expressed as a negative number. For example, a value of 170, which is measured counterclockwise from the X axis of Quadrant I, indicates the same point as a value of −190, which is measured clockwise from the X axis of Quadrant I. The exemplary embodiment illustrates that the user authentication angle based on the selection of the user gaze point Ps is expressed as a positive value.

According to various embodiments, the user gaze point Ps may not be fixed but may change during an authentication procedure after being set by the user. For example, the user gaze point Ps may be set after the rotation of the electronic device or a different user gaze point may be set in each of a plurality of rotations of the electronic device.

According to various embodiments, the user gaze point Ps may change in position over time according to a parameter defined at random by the user. For example, the user gaze point Ps may be set to be moved by +5 degrees every five seconds.

According to various embodiments, the electronic device may provide the user with feedback on a user gaze point Ps selection and an angle selection. For example, the electronic device may indicate that a user gaze point Ps has been selected by providing a text element or changing a random graphic element of the electronic device. Further, the electronic device may use a vibration or sound for notifying the user.

According to various embodiments, the electronic device may display a graphic gauge panel such that the user may rotate the graphic gauge panel displayed on the screen, gazing at the user gaze point Ps, instead that the user rotates the electronic device, gazing at the user gaze point Ps.

Referring to FIG. 5, the electronic device 500 may be rotated by a value of a by the user. In this case, a user authentication angle of b 503 is an angle from an Xa axis to a Yb axis, and thus a value of b that is 503 is equal to the value measured in FIG. 4. In the exemplary embodiment, a code for user authentication is generated using the sum of the user authentication angle 503 based on a user gaze point 502 and a rotation angle 504 based on the rotation of the electronic device 500. Thus, when a third person rotates the electronic device 500 by the same angle as the rotation angle 504 but does not know the user gaze point, the code for user authentication is not generated, thus failing in user authentication.

FIGS. 6A to 6D and FIGS. 7A to 7D illustrate that a code for user authentication is calculated according to various embodiments.

Figure 6A:
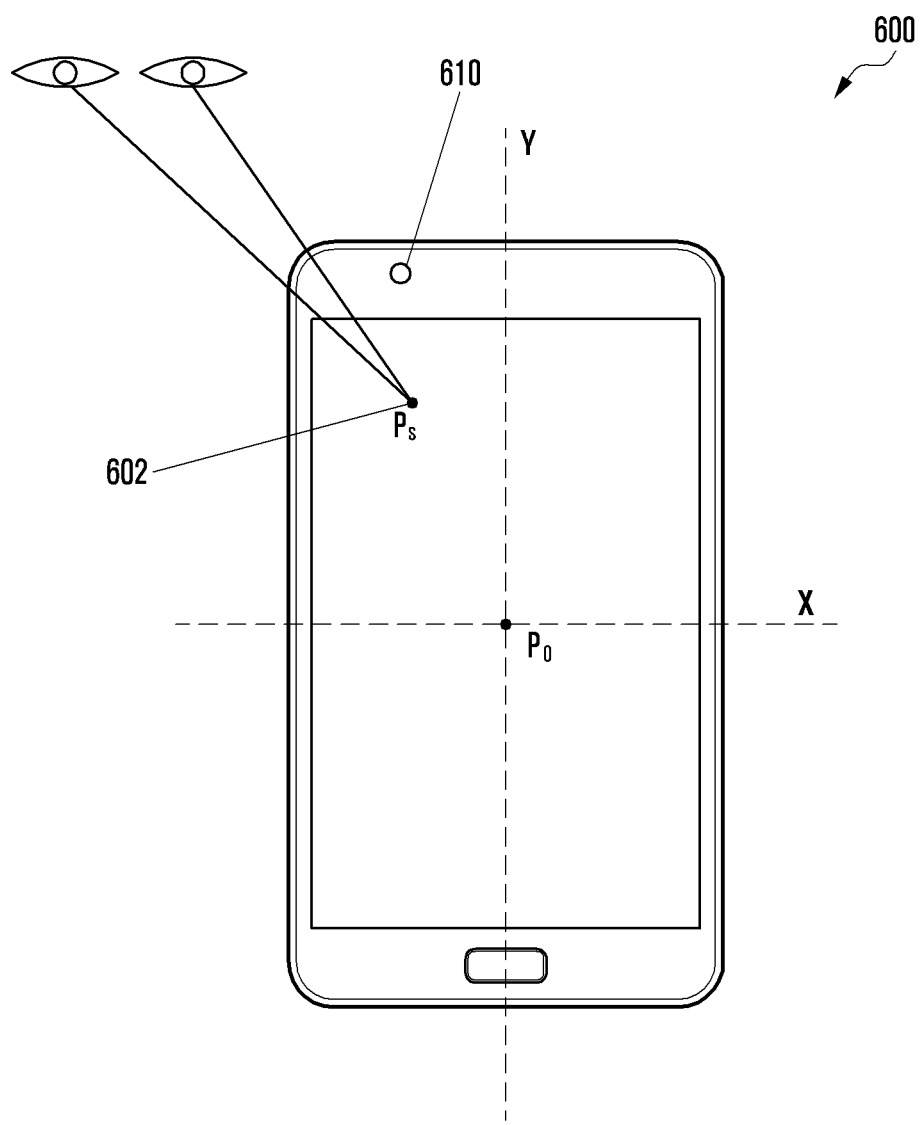
FIGS. 6A to 6D illustrate that a code for user authentication is calculated according to various embodiments.

Referring to FIG. 6A, an electronic device 600 may detect through a front camera 610 that a user gazes at a specific point. The electronic device 600 may set the specific point at which the user gazes as a user gaze point Ps 602.

Figure 6B:
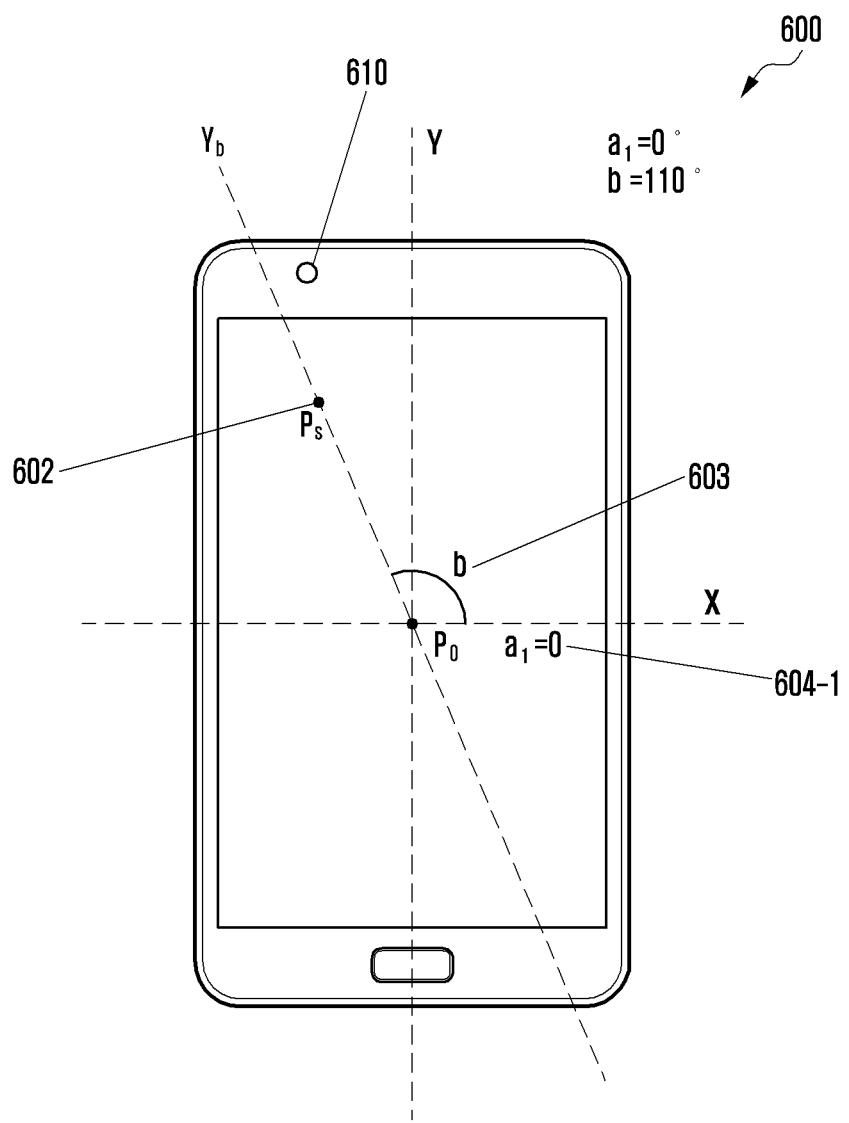

Referring to FIG. 6B, the electronic device 600 may measure a user authentication angle of b 603 corresponding to the user gaze point Ps 602. The electronic device 600 may measure the user authentication angle of b 603 that is an angle from an X axis to a Yb axis corresponding to the user gaze point Ps 602. In FIG. 6B, the user authentication angle of b 603 may be 110. In FIG. 6B, since the electronic device 600 detects no rotation, a rotation angle of a1 604-1 is 0.

Figure 6C:
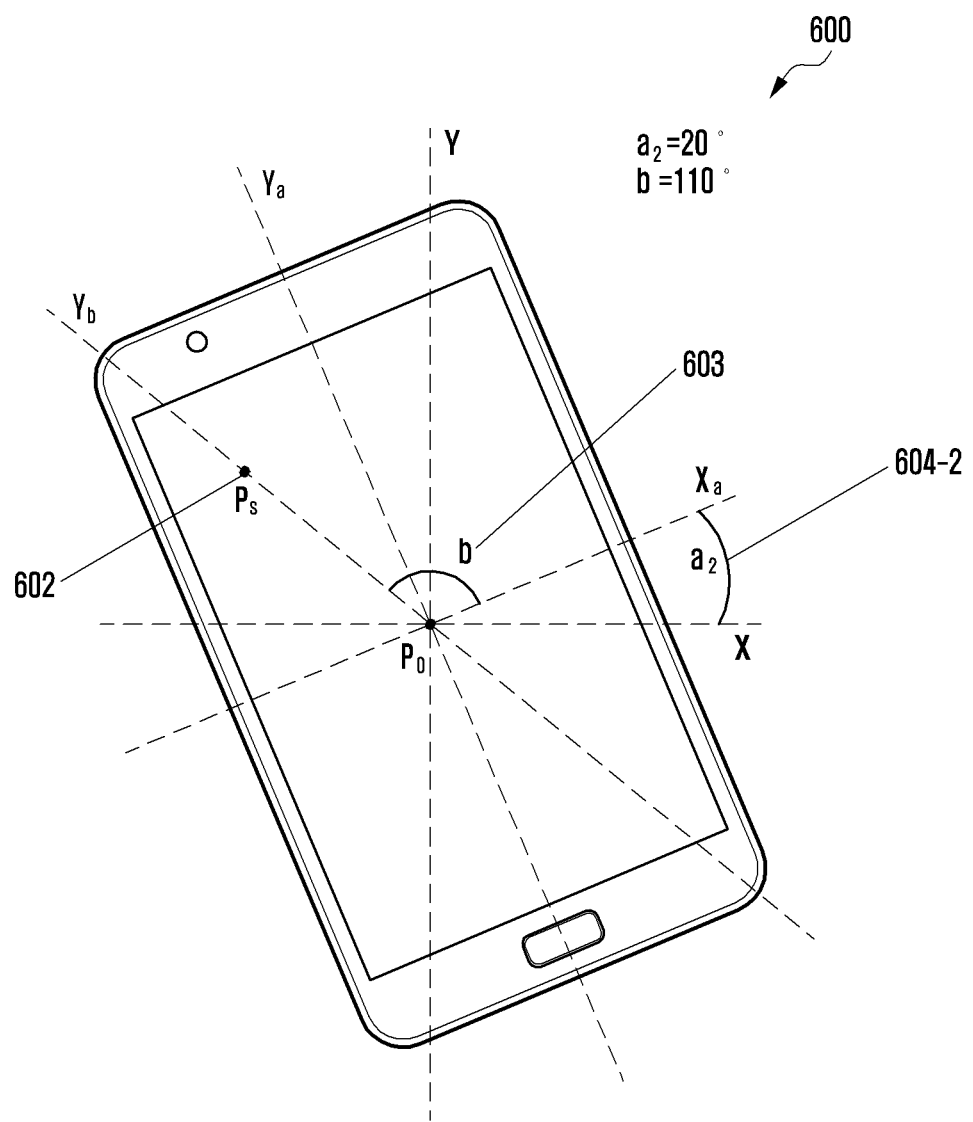

Referring to FIG. 6C, the electronic device 600 may detect a rotation. In FIG. 6C, since the electronic device 600 is rotated counterclockwise by 20 degrees, a rotation angle 604-2, a2, may be 20. Thus, in FIG. 6C, a code c may have a value of 130, which is the sum of the user authentication angle 603 and the rotation angle 604-2.

Figure 6D:
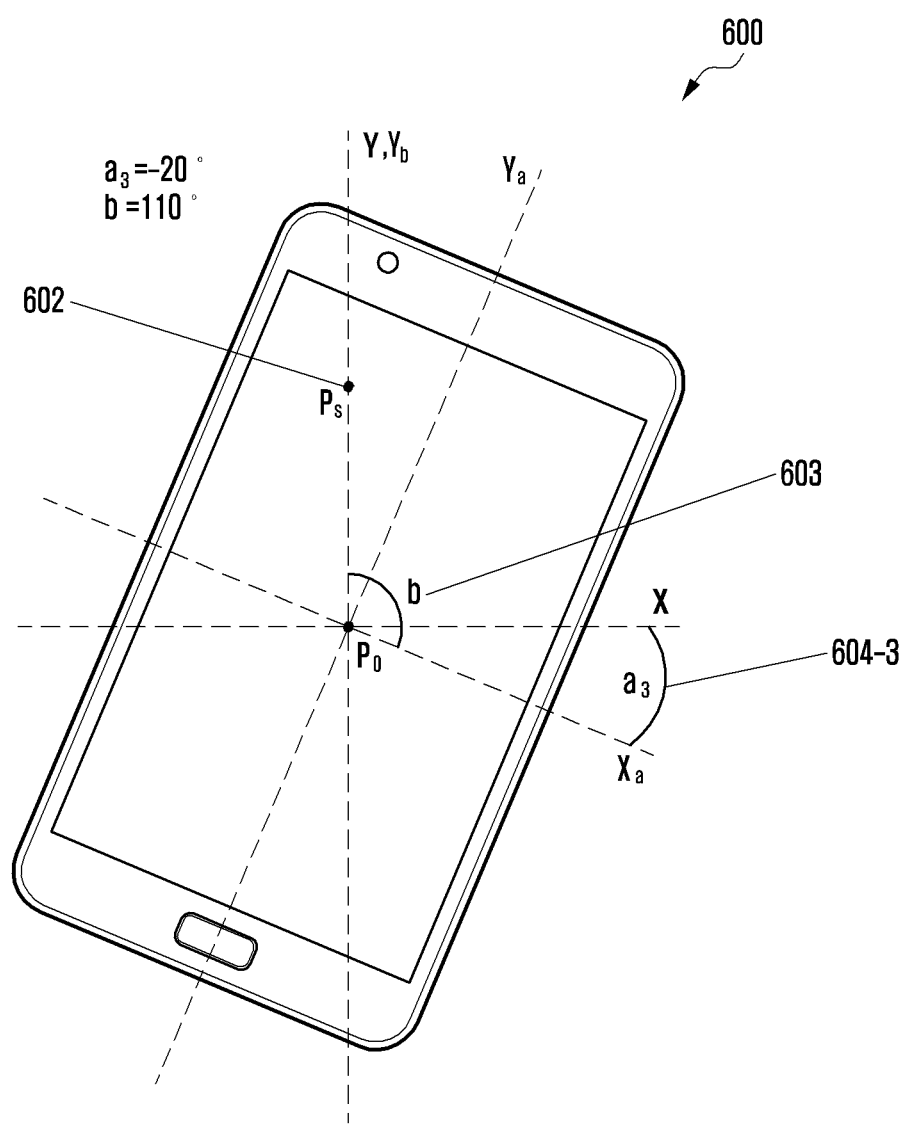

Referring to FIG. 6D, since the electronic device 600 is rotated clockwise by 20 degrees, a rotation angle 604-3, a3, may be −20. Thus, in FIG. 6D, the code c may have a value of 90, which is the sum of the user authentication angle 603 and the rotation angle 604-3.

Figure 7A:
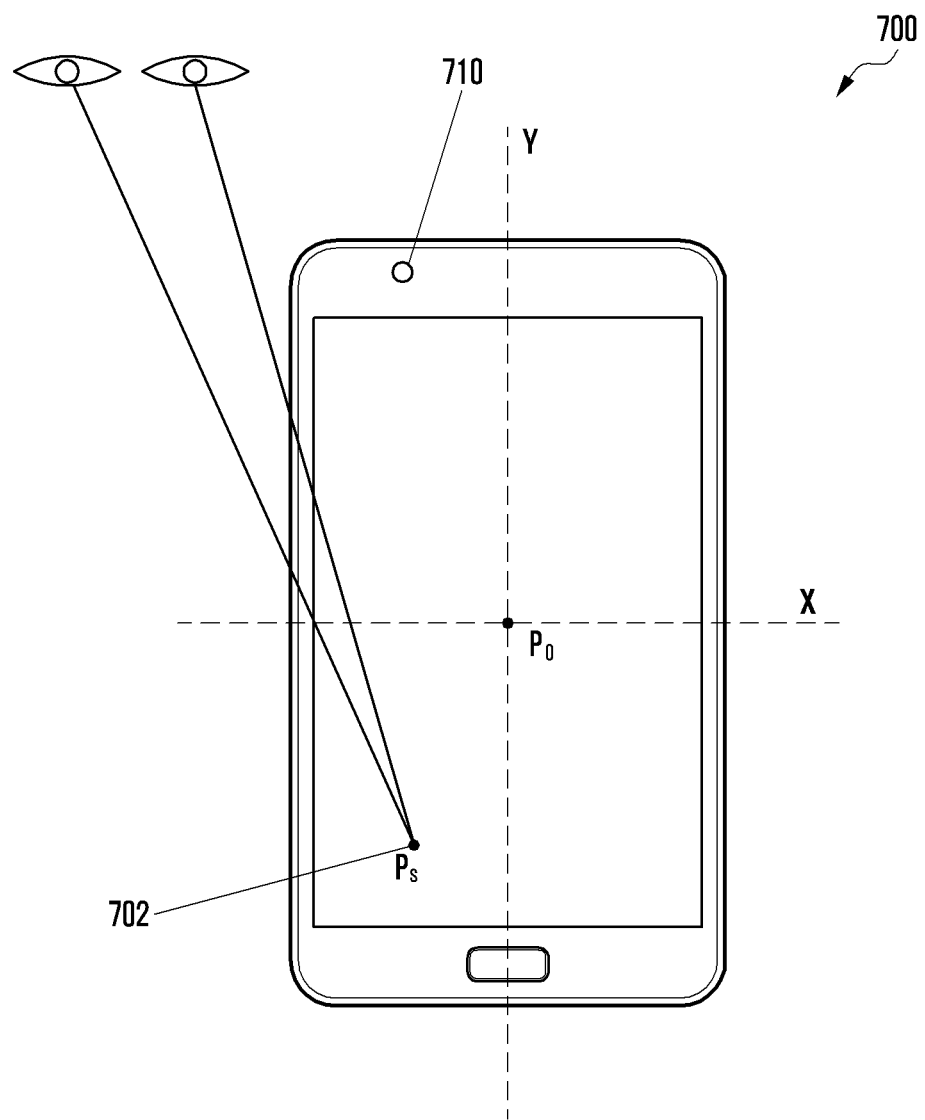
FIGS. 7A to 7D illustrate that a code for user authentication is calculated according to various embodiments.
Figure 7B:
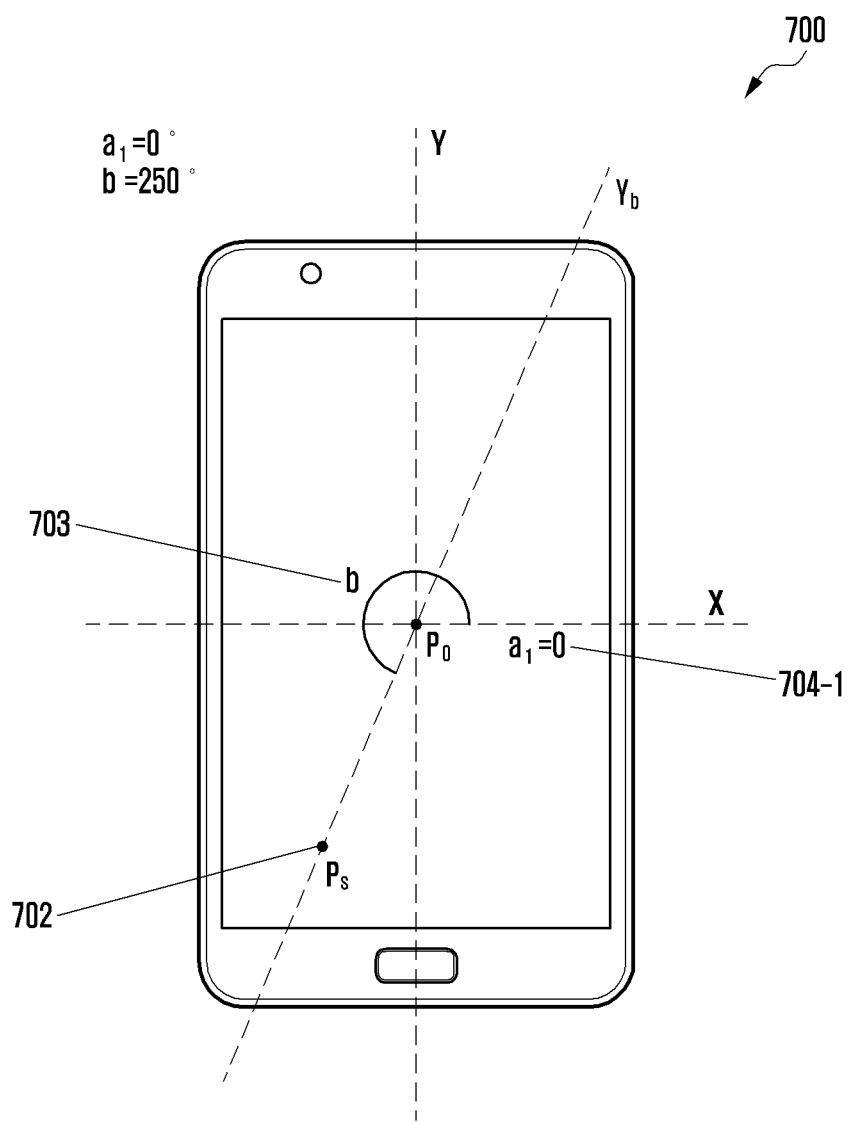

For another example, referring to FIG. 7A, an electronic device 700 may detect through a front camera 710 that a user gazes at a specific point. The electronic device 700 may set the specific point at which the user gazes as a user gaze point Ps 702. Referring to FIG. 7B, the electronic device 700 may measure a user authentication angle of b 703 corresponding to the user gaze point Ps 702. In FIG. 7B, the user authentication angle of b 703 may be 250. In FIG. 7B, since the electronic device 700 detects no rotation of the electronic device 700, a rotation angle of a1 704-1 is 0.

Figure 7C:
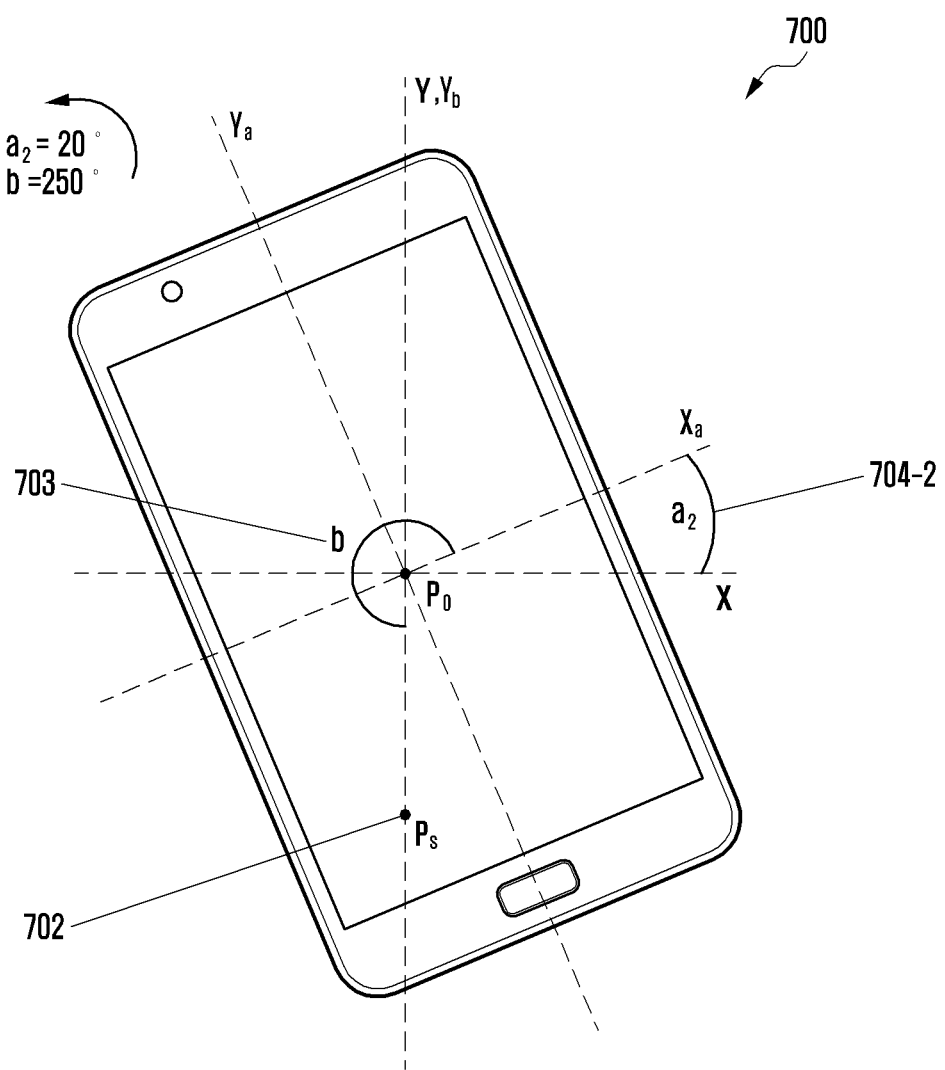

Referring to FIG. 7C, the electronic device 700 may detect a rotation of the electronic device 700. In FIG. 7C, since the electronic device 700 is rotated counterclockwise by 20 degrees, a rotation angle 704-2, a2, may be 20. Thus, in FIG. 7C, a code c may have a value of 270, which is the sum of the user authentication angle 703 and the rotation angle 704-2.

Figure 7D:
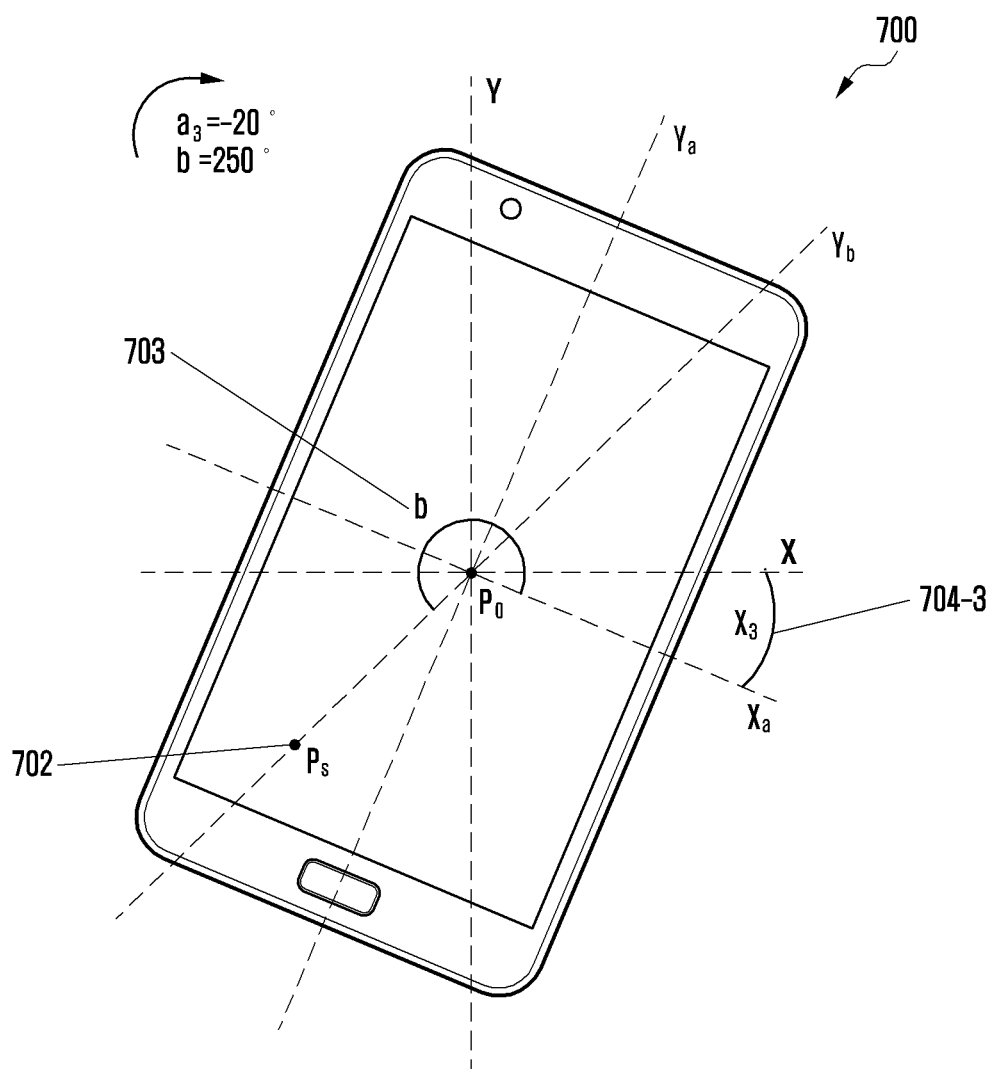

Referring to FIG. 7D, since the electronic device 700 is rotated clockwise by 20 degrees, a rotation angle 704-3, a3, may be −20. Thus, in FIG. 7D, the code c may have a value of 230, which is the sum of the user authentication angle 703 and the rotation angle 704-3.

Referring to FIGS. 6A to 6D and FIGS. 7A to 7D, the rotations of the electronic devices 600 and 700 in FIG. 6C and FIG. 7C are the same, and the rotations of the electronic devices 600 and 700 in FIG. 6D and FIG. 7D are the same. FIG. 6C and FIG. 7C illustrate a counterclockwise rotation by 20 degrees, while FIG. 6D and FIG. 7D illustrate a clockwise rotation by 20 degrees. However, since the set user gaze points 602 and 702 are different, the codes c have different values. Thus, when a third person rotates an electronic device by the same rotation angle as when storing a code for user authentication but does not know a user gaze point set when storing the code for user authentication, the third person fails in user authentication.

FIGS. 8A to 8F illustrate that a code for user authentication is calculated according to various embodiments.

Figure 8A:
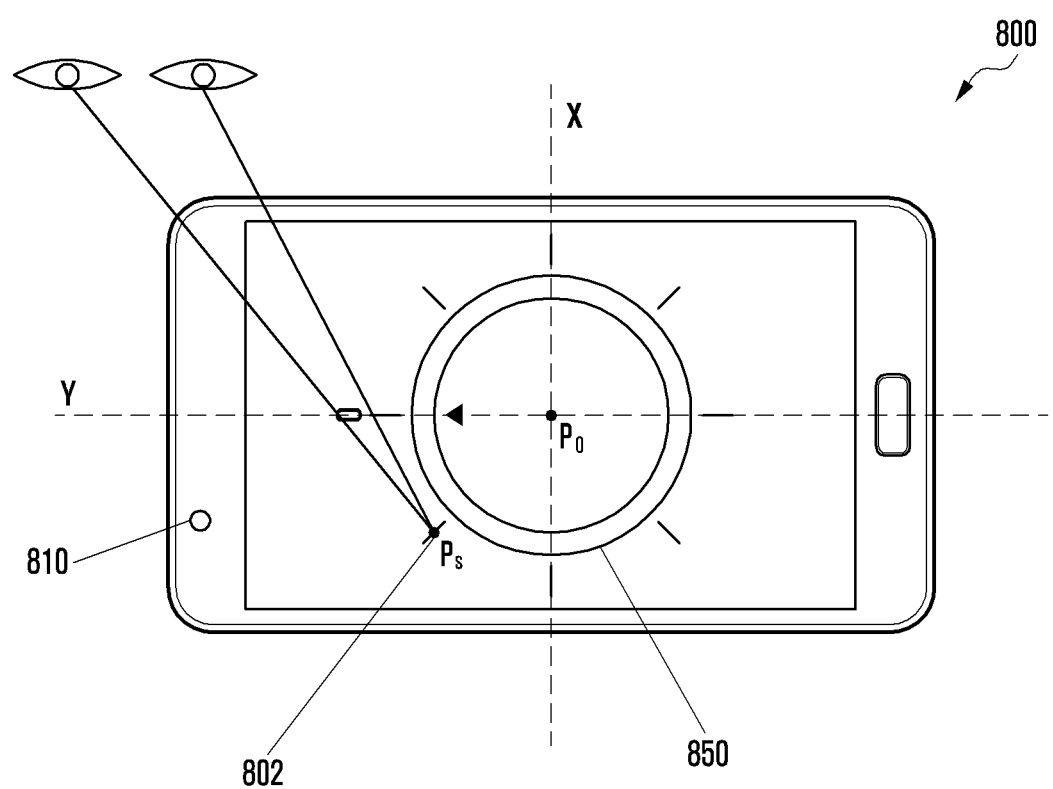
FIGS. 8A to 8F illustrate that a code for user authentication is calculated according to various embodiments.

Referring to FIG. 8A, an electronic device 800 may display a graphic gauge 850 on a screen. The graphic gauge may have a circular shape to indicate 360 degrees and may include a needle for easily recognizing an angle changed based on the rotation of the electronic device 800.

The electronic device 800 may detect through a front camera 810 that a user gazes at a specific point. The electronic device 800 may set the specific point at which the user gazes as a user gaze point Ps 802.

Figure 8B:
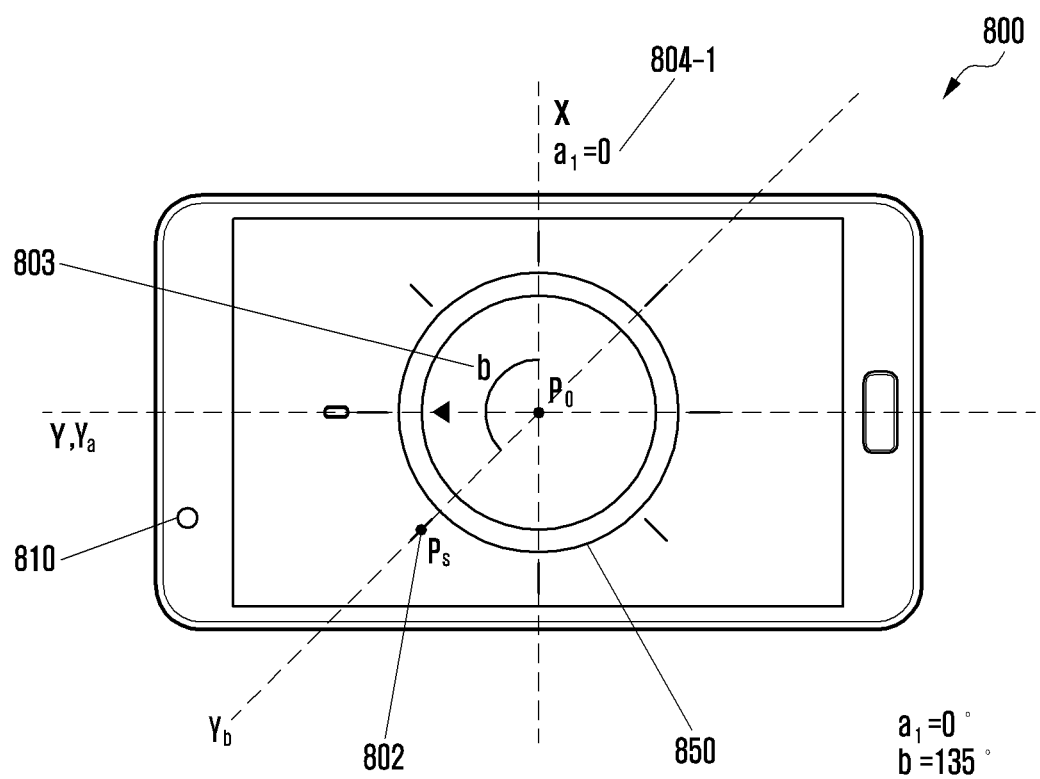

Referring to FIG. 8B, the electronic device 800 may measure a user authentication angle of b 803 that is an angle from an X axis to a Yb axis corresponding to the user gaze point Ps 802. In one embodiment, the user authentication angle of b 803 is 135. In FIG. 8B, since the electronic device 800 is not rotated, a rotation angle of a1 804-1 may be 0.

Figure 8C:
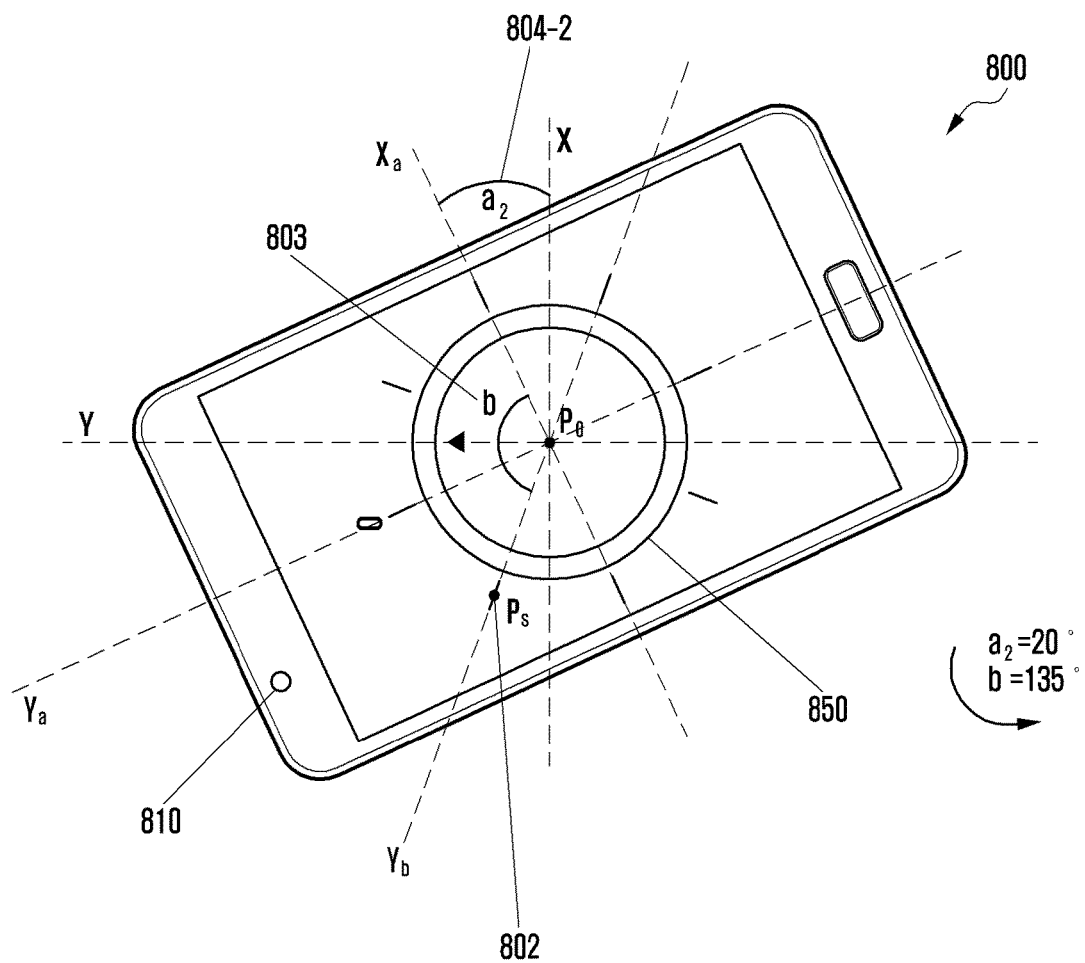

Referring to FIG. 8C, when the electronic device 800 is rotated by 20 degrees, a rotation angle 804-2, a2, may be 20. Since the measured rotation angle 804-2, a2, is 20 and the user authentication angle of b 803 is 135, a code c has a value of 155.

Figure 8D:
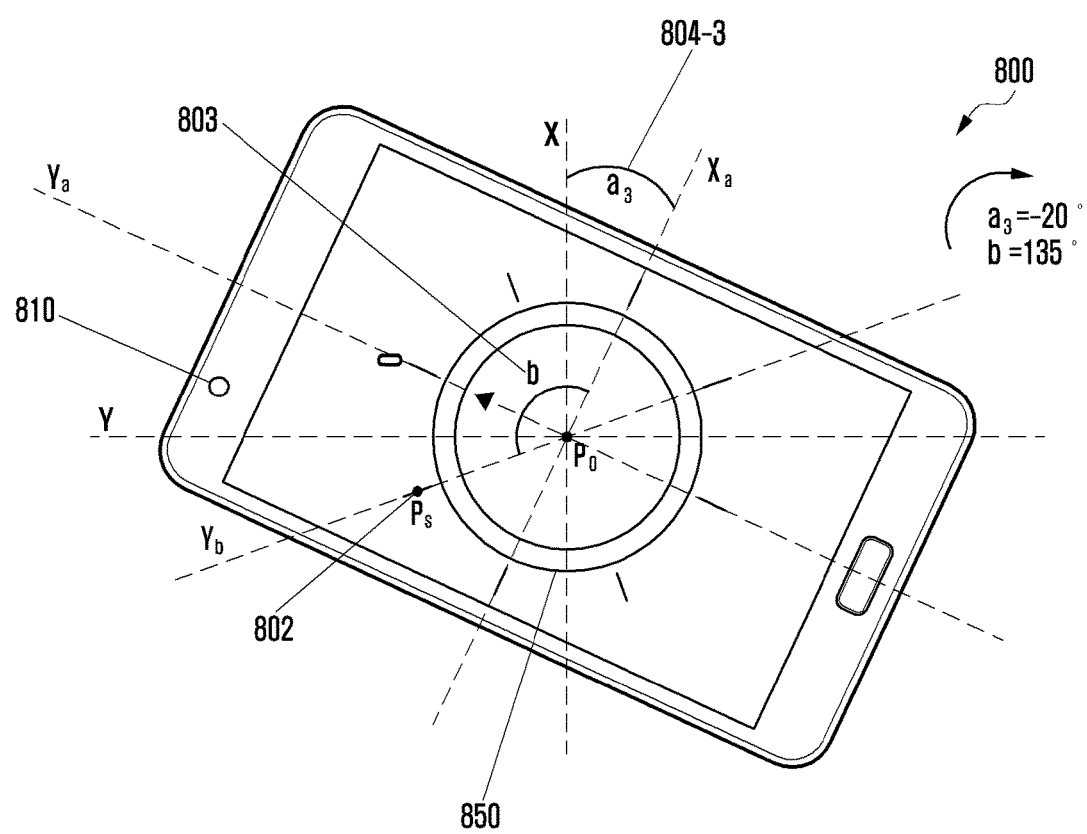

Referring to FIG. 8D, since the electronic device 800 is rotated by −20 degrees, a rotation angle 804-3, a3, may be −20. Since the rotation angle 804-3 of the electronic device 800, a3, is −20 and the user authentication angle of b 803 is 135, the code c has a value of 115.

Figure 8E:
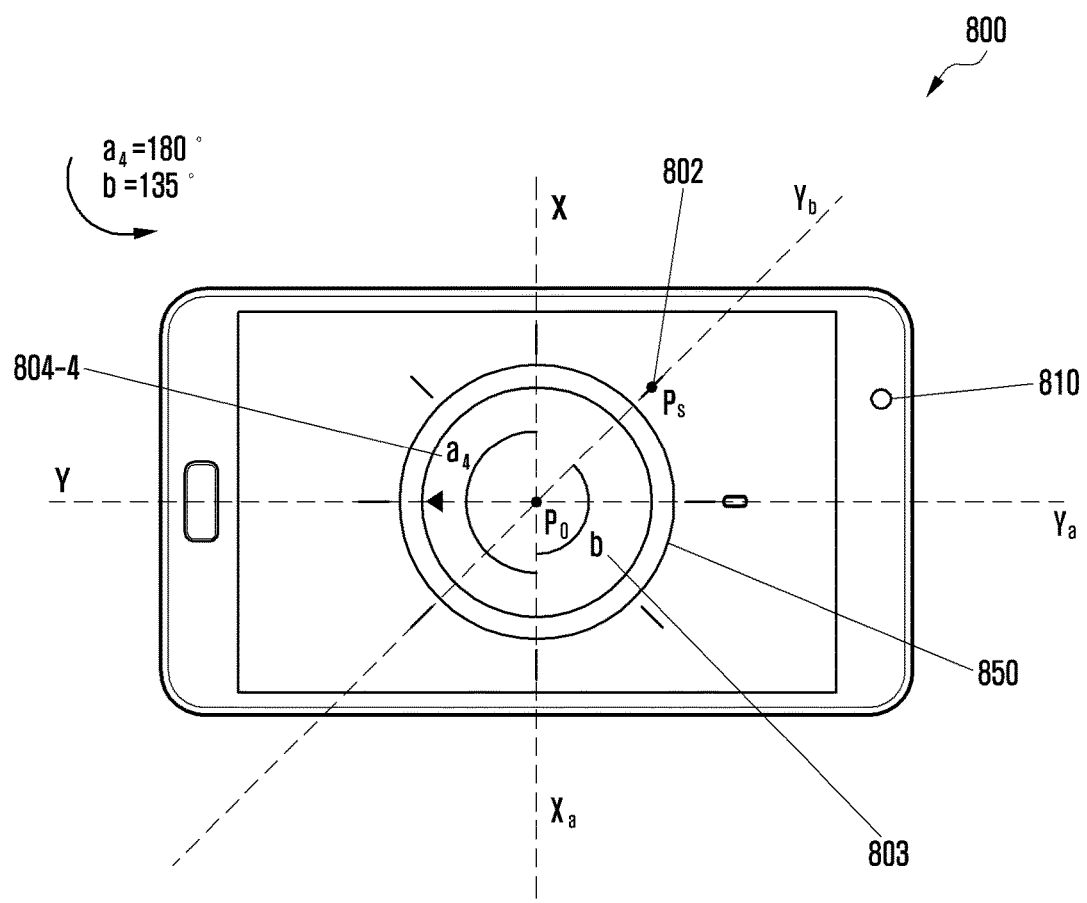

Referring to FIG. 8E, since the electronic device 800 is rotated by 180 degrees, a rotation angle 804-4, a4, may be 180. Since the rotation angle 804-4 of the electronic device 800, a4, is 180 and the user authentication angle of b 803 is 135, the code c has a value of 315.

Figure 8F:
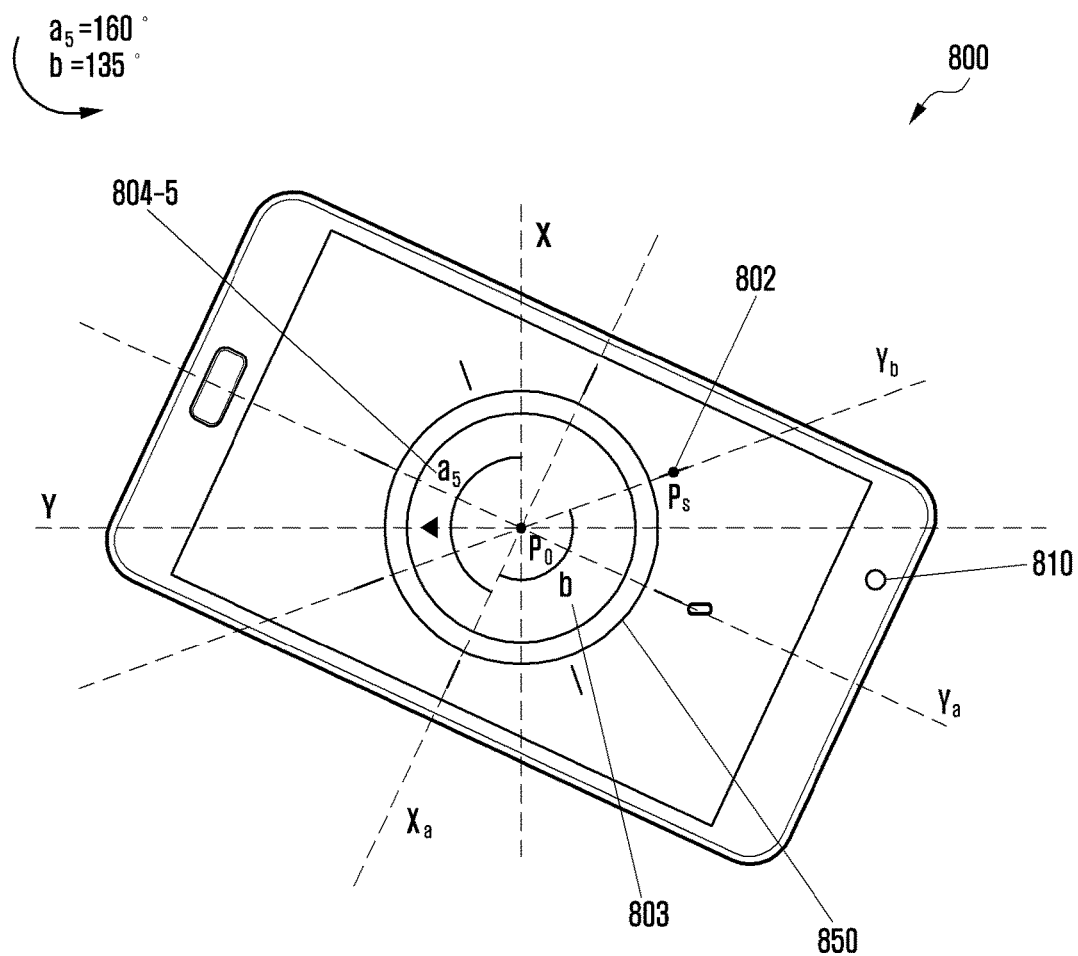

Referring to FIG. 8F, since the electronic device 800 is rotated by 160 degrees, a rotation angle 804-5, a5, may be 160. Since the rotation angle 804-5 of the electronic device 800, a5, is 160 and the user authentication angle of b 803 is 135, the code c has a value of 295.

Due to the graphic gauge 850 illustrated in FIGS. 8A to 8F, the electronic device 800 may allow the user to easily input a rotation angle of the electronic device 800 for a user authentication procedure.

As illustrated in the exemplary embodiment, when a user gaze point is selected and the device is rotated twice, 5184 combinations may be obtained. However, the electronic device may determine that one of these combinations is for user authentication. Further, when a user gaze point is selected and the device is rotated three times, 373248 combinations may be obtained. In addition, when a user gaze point is changed every rotation, about 26.8 million combinations may be obtained.

According to various embodiments, the electronic device may request an additional condition for unlocking the electronic device such that the electronic device is moved along an X, Y, or Z axis or a line connecting a center point Po of the electronic device and a user gaze point Ps.

According to various embodiments, prior to a user authentication procedure, the electronic device may preset the maximum distance and angle between the electronic device and a user gaze. The electronic device may display a notification to a user to perform the user authentication procedure for adaptation to the set maximum distance and angle.

According to various embodiments, prior to a user authentication procedure, the electronic device may perform a procedure of detecting a user's look and determining whether the detected look matches a previously stored user's look.

Figure 9:
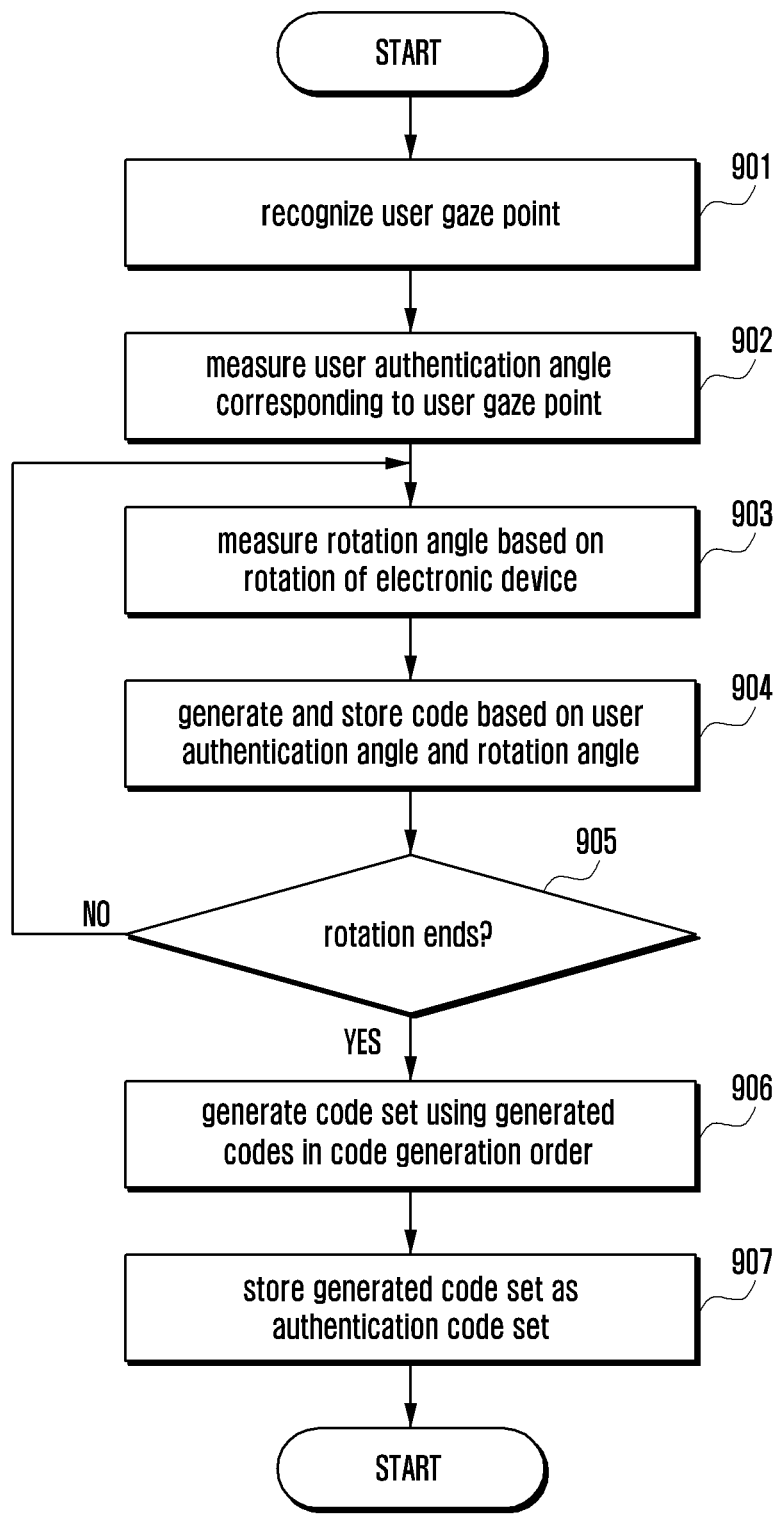
FIG. 9 is a flowchart illustrating a user authentication procedure of an electronic device according to various embodiments.

FIG. 9 is a flowchart illustrating a user authentication procedure of an electronic device according to various embodiments. FIGS. 10A to 10D illustrate that an electronic device generates a code set according to various embodiments.

Referring to FIG. 9, an electronic device may recognize a user gaze point in operation 901. To recognize the user gaze point, the electronic device may request a user to set the user gaze point. The electronic device may display a notification on a screen to make the request.

Figure 10A:
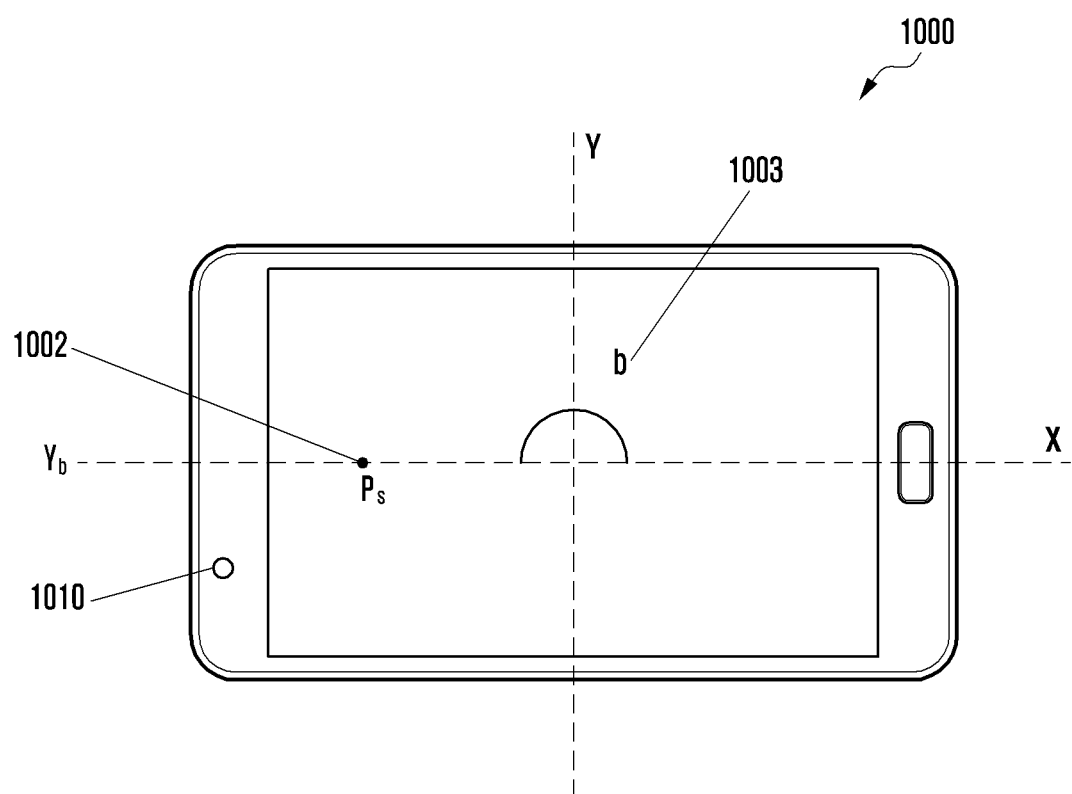
FIGS. 10A to 10D illustrate that an electronic device generates a code set according to various embodiments.

Referring to FIG. 10A, an electronic device 1000 may recognize that a user gazes at a specific point Ps 1002 upon the request and may recognize and set the specific point as a user gaze point Ps 1002.

In operation 902, the electronic device may measure a user authentication angle corresponding to the user gaze point. Referring to FIG. 10A, the electronic device 1000 may measure a user authentication angle of b 1003 that is an angle from an X axis to a Yb axis corresponding to the user gaze point Ps 1002. In one embodiment, the user authentication angle of b 1003 is 180 in FIG. 10A.

In operation 903, the electronic device may measure a rotation angle based on the rotation of the electronic device. For example, in FIG. 10A, the electronic device 1000 may detect the rotation of the electronic device 1000 while recognizing that the user gazes at the set user gaze point Ps 1002. The electronic device 1000 may measure a rotation angle based on the rotation of the electronic device 1000.

Figure 10B:
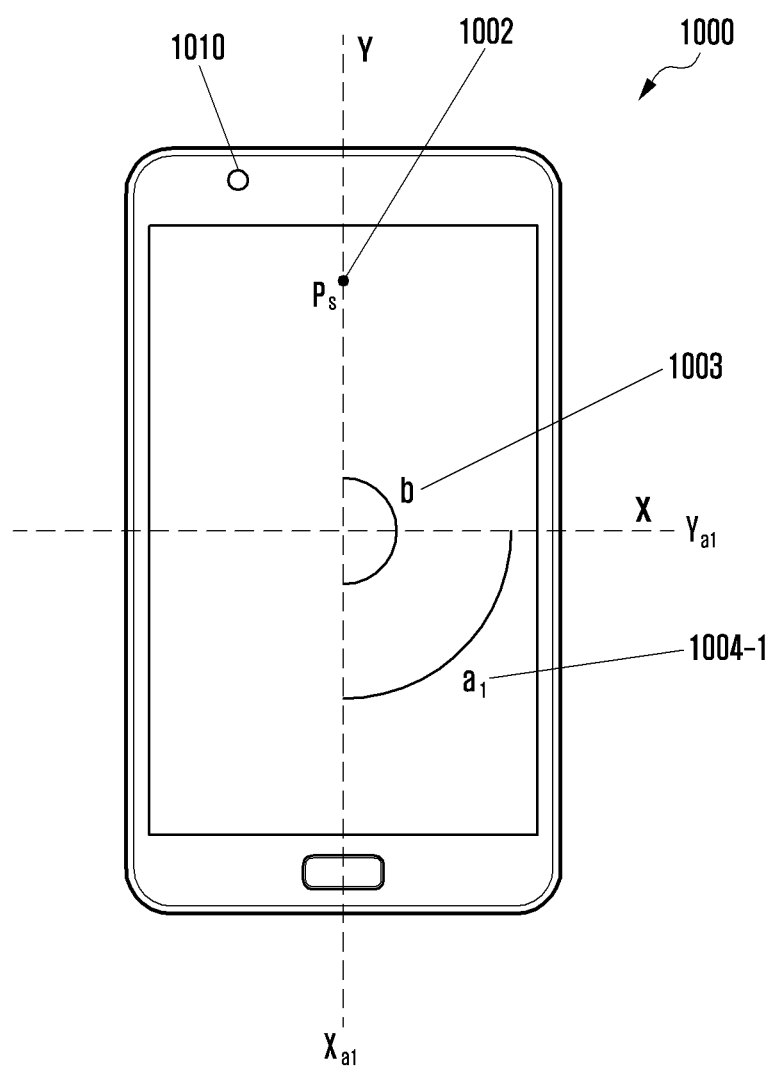

Referring to FIG. 10B, the electronic device 1000 may detect a 90-degree clockwise rotation and may measure a rotation angle of a1 1004-1 that is −90. The rotation angle of a1 1004-1 may refer to an angle from the X axis before the rotation to an Xa1 axis that is changed by a1 after the rotation. In the example illustrated in FIGS. 10A to 10D, since a plurality of rotations is detected, an axis changed first by a1 is represented by Xa1 in FIG. 10B to indicate a first rotation. That is, the rotation angle of a1 1004-1 may refer to an angle from the X axis before the rotation to an Xa1 axis that is changed by a1 after the rotation.

The rotation angle of a1 may be measured in negative or positive values depending on a rotation direction. The rotation angle may be determined to be a negative value or positive value based on a rotation direction according to user's settings. In the present example, it is assumed that a clockwise rotation is measured in negative values, while a counterclockwise rotation is measured in positive values.

Subsequently, in operation 904, the electronic device may generate and store a code based on the user authentication angle and the measured rotation angle. A code c may be generated to be the sum of the user authentication angle and the measured rotation angle. Referring to FIG. 10B, since the user authentication angle of b 1003 is 180 and the rotation angle of a1 1004-1 is −90, a code c1 is 90.

In operation 905, the electronic device may determine whether the electronic device is further rotated, and may proceed back to operation 903 if a rotation is detected. In the example illustrated in FIGS. 10A to 10D, three rotations happen in total.

Figure 10C:
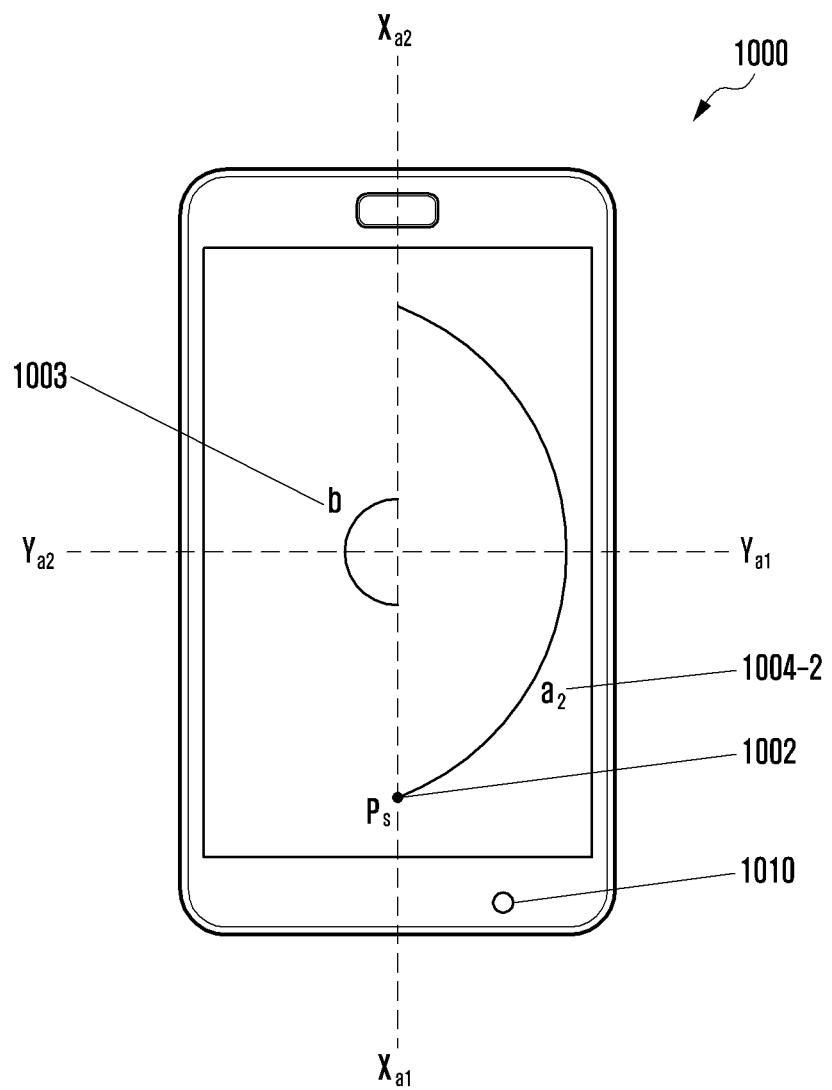

Referring to FIG. 10C, the electronic device 1000 may detect a 180-degree counterclockwise rotation and may measure a rotation angle of a2 1004-2 that is 180. The rotation angle of a2 1004-2 may refer to an angle from the Xa1 axis before the rotation to an Xa2 axis that is changed by a2 after the rotation.

Subsequently, in operation 904, the electronic device may generate and store a code based on the user authentication angle and the measured rotation angle. A code c may be generated to be the sum of the user authentication angle and the measured rotation angle. Referring to FIG. 10C, since the user authentication angle of b is 180 and the rotation angle of a2 1004-2 is 180, a code c2 is 360.

Figure 10D:
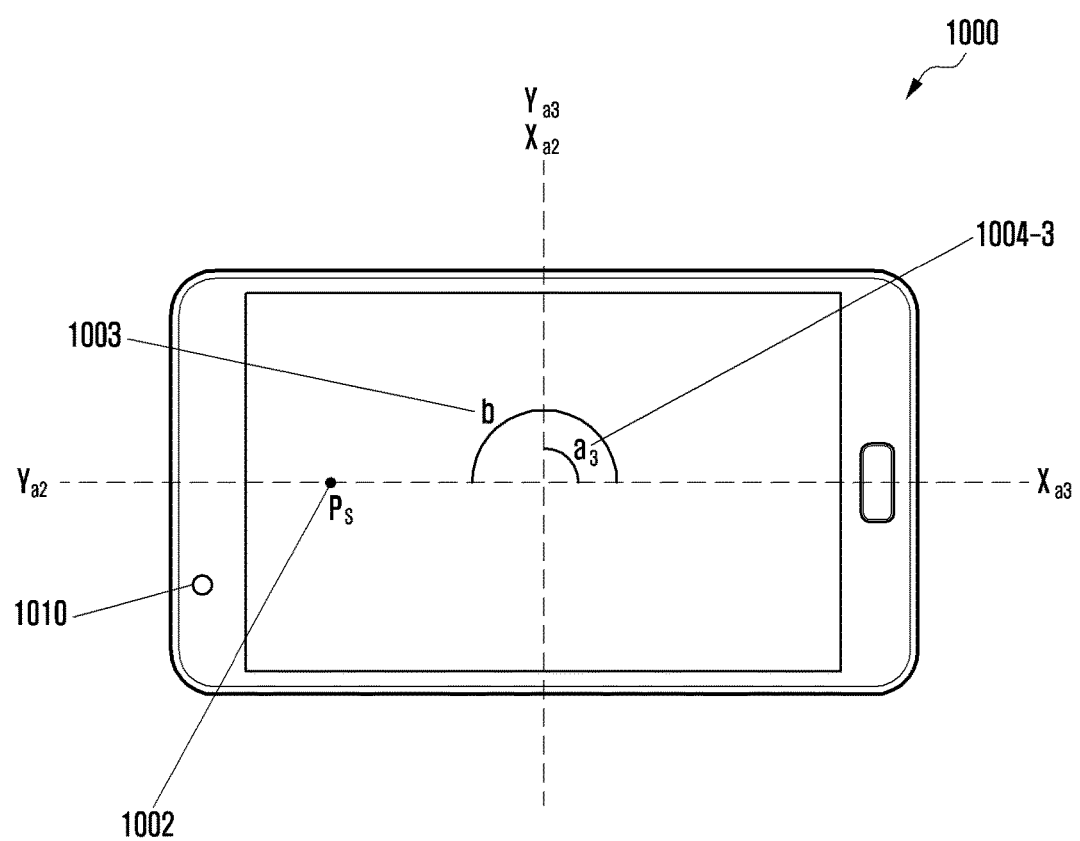

In operation 905, the electronic device may determine whether the electronic device is further rotated, and may proceed back to operation 903 if a rotation is detected. Referring to FIG. 10D, the electronic device 1000 may detect a 90-degree clockwise rotation and may measure a rotation angle of a3 1004-3 that is −90. The rotation angle of a3 1004-3 may refer to an angle from the Xa2 axis before the rotation to an Xa3 axis that is changed by a3 after the rotation.

Subsequently, in operation 904, the electronic device may generate and store a code based on the user authentication angle and the measured rotation angle. A code c may be generated to be the sum of the user authentication angle and the measured rotation angle. Referring to FIG. 10D, since the user authentication angle of b is 180 and the rotation angle of a3 1004-3 is −90, a code c3 is 90.

In operation 905, the electronic device may determine whether the electronic device is further rotated, and may proceed to operation 906 if no rotation is detected.

In operation 906, the electronic device may generate a code set using the generated codes in a code generation order. Referring to FIGS. 10A to 10D, the generated codes are c1, c2, and c3 according to the code generation order. A code set C may be a set of 90, 360, and 90.

In operation 907, the electronic device may store the generated code set C as an authentication code set, which may be used later as a reference value for user authentication. Subsequently, the electronic device compares an input code set with the stored code set as the authentication code set to determine the success or failure of user authentication. In one embodiment, the electronic device may determine that user authentication is successful when an input code set and the stored code set as the authentication code set have the same code values and the same order of codes. When it is determined that the user authentication is successful, the electronic device may unlock the electronic device.

Figure 11:
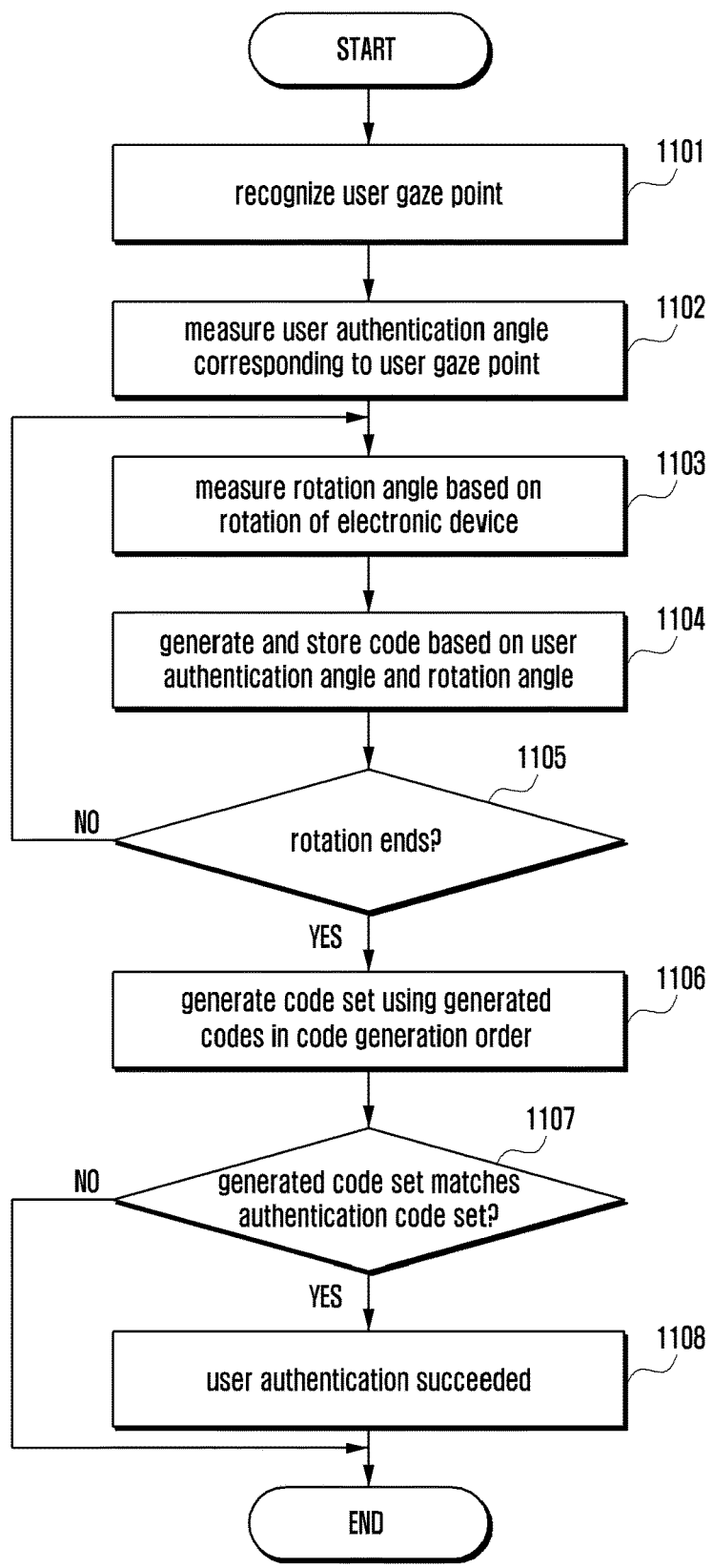
FIG. 11 is a flowchart illustrating a user authentication procedure of an electronic device according to various embodiments.

FIG. 11 is a flowchart illustrating a user authentication procedure of an electronic device according to various embodiments. FIGS. 12A to 12D illustrate that an electronic device generates a code set according to various embodiments.

Referring to FIG. 11, an electronic device may recognize a user gaze point in operation 1101. Although not shown in the flowchart of FIG. 11, the electronic device may request a user to set the user gaze point for the user authentication procedure of the electronic device. The electronic device may display a notification on a screen to make the request.

Figure 12A:
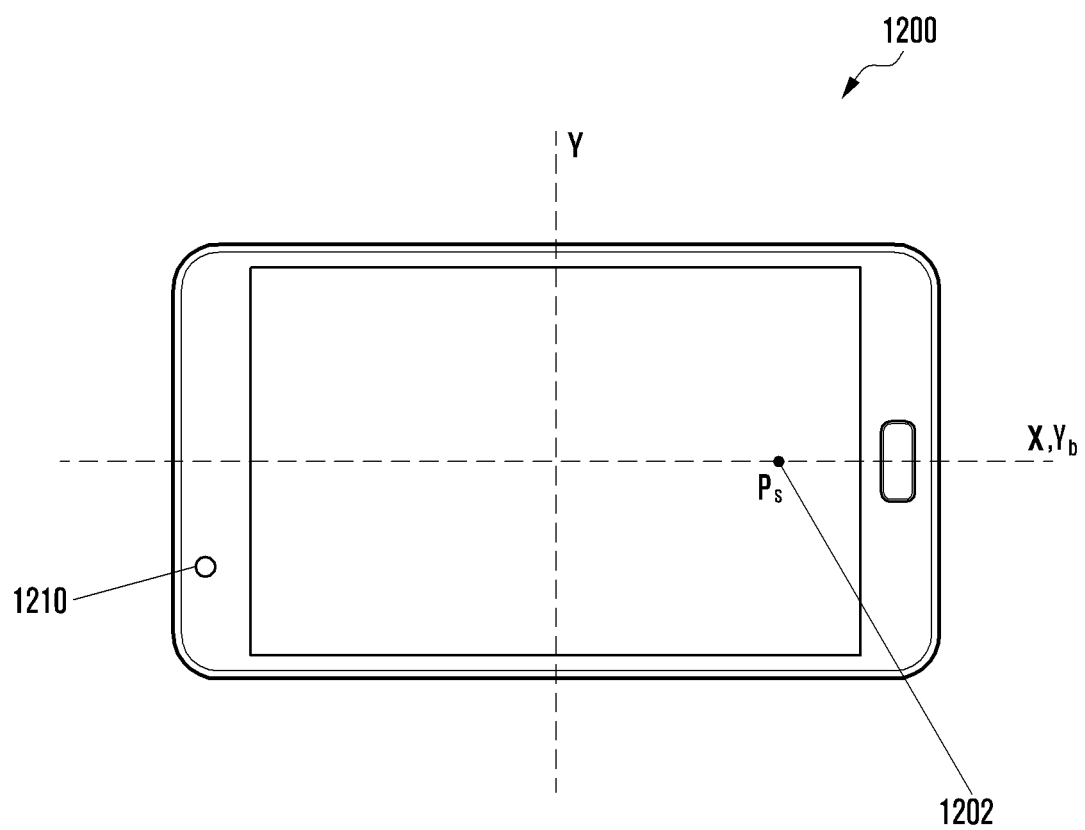
FIGS. 12A to 12D illustrate that an electronic device generates a code set according to various embodiments.

Referring to FIG. 12A, an electronic device 1200 may recognize that a user gazes at a specific point Ps 1202 upon the request and may recognize and set the specific point as a user gaze point Ps 1202.

In operation 1102, the electronic device may measure a user authentication angle corresponding to the user gaze point. Referring to FIG. 12A, the electronic device 1200 may measure an angle of b from an X axis to a Yb axis corresponding to the user gaze point Ps 1202. In one embodiment, the user authentication angle of b is 0 in FIG. 12A.

In operation 1103, the electronic device may measure a rotation angle based on the rotation of the electronic device. For example, in FIG. 12A, the electronic device 1200 may detect the rotation of the electronic device 1200 while recognizing that the user gazes at the set user gaze point Ps 1202. The electronic device 1200 may measure a rotation angle based on the rotation of the electronic device 1200.

Figure 12B:
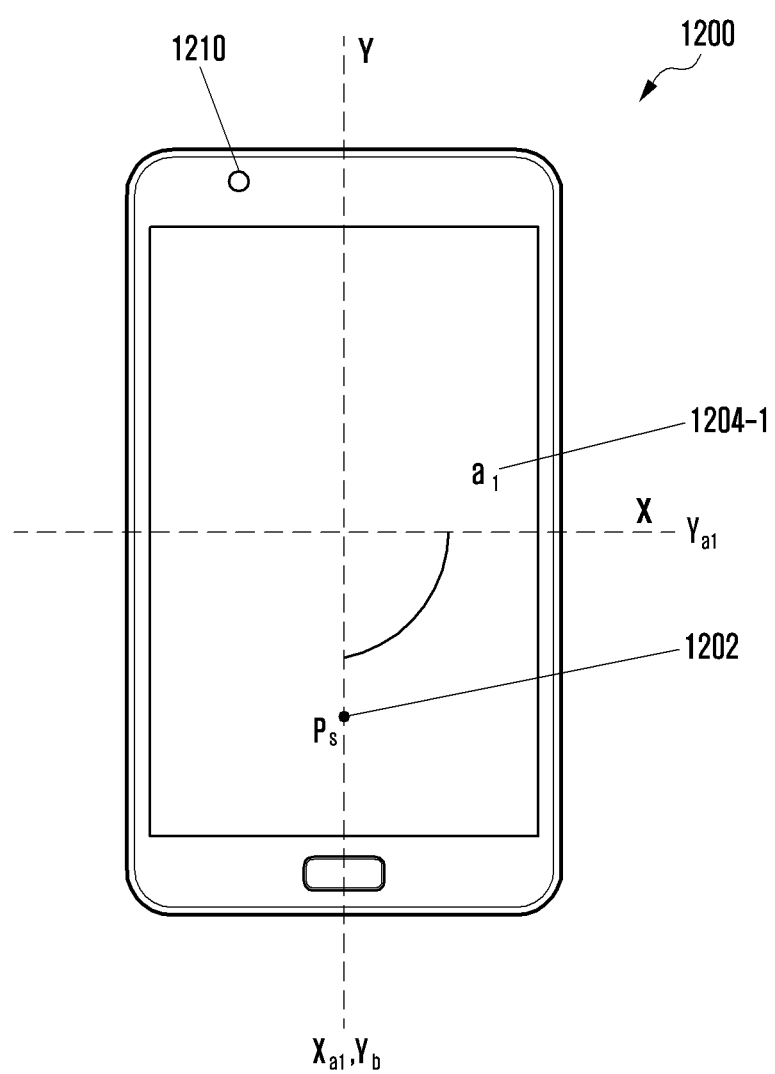

Referring to FIG. 12B, the electronic device 1200 may detect a 90-degree clockwise rotation and may measure a rotation angle of a1 1204-1 that is −90. The rotation angle of a1 1204-1 may refer to an angle from the X axis before the rotation to an Xa1 axis that is changed by a1 after the rotation. In the example illustrated in FIGS. 12A to 12D, since a plurality of rotations is detected, an axis changed first by a1 is represented by Xa1 in FIG. 12B to indicate a first rotation. That is, the rotation angle of a1 1204-1 may refer to an angle from the X axis before the rotation to an Xa1 axis that is changed by a1 after the rotation.

The rotation angle of a1 may be measured in negative or positive values depending on a rotation direction. The rotation angle may be determined to be a negative value or positive value based on a rotation direction according to user's settings. In the present example, it is assumed that a clockwise rotation is measured in negative values, while a counterclockwise rotation is measured in positive values.

Subsequently, in operation 1104, the electronic device may generate and store a code based on the user authentication angle and the measured rotation angle. A code c may be generated to be the sum of the user authentication angle and the measured rotation angle. Referring to FIG. 12B, since the user authentication angle of b is 0 and the rotation angle of a1 1204-1 is −90, a code c1 is −90.

In operation 1105, the electronic device may determine whether the electronic device is further rotated, and may proceed back to operation 1103 if a rotation is detected. In the example illustrated in FIGS. 12A to 12D, three rotations happen in total.

Figure 12C:
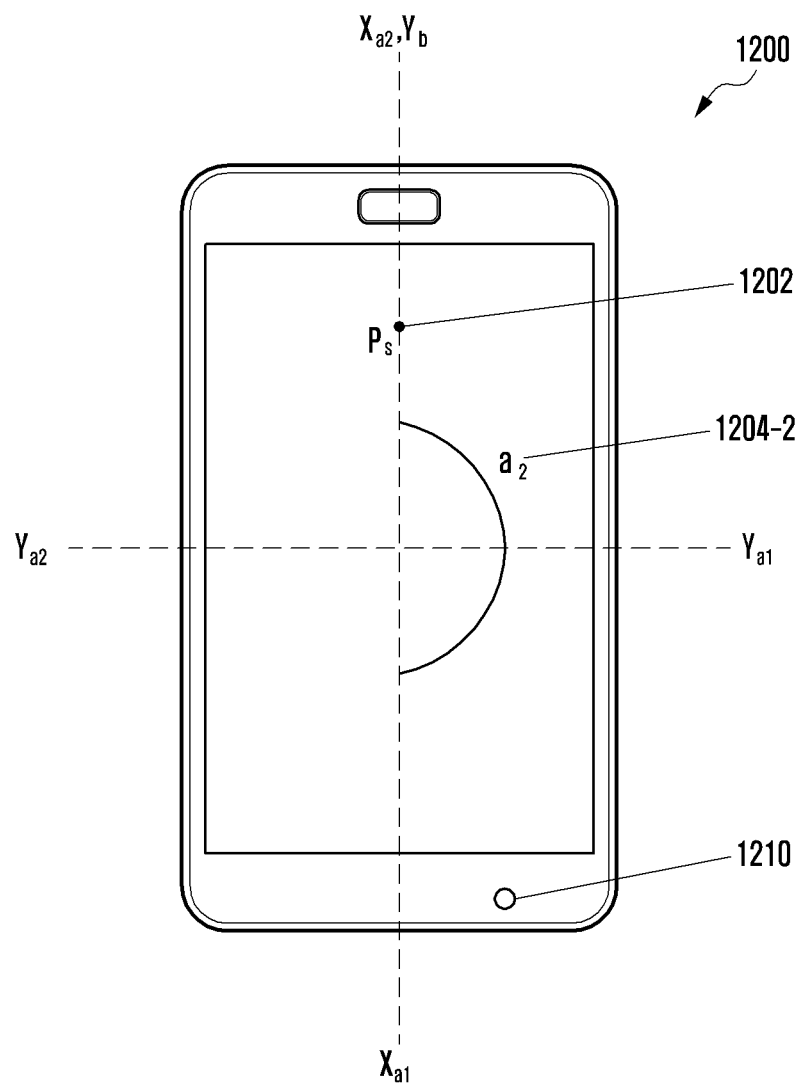

Referring to FIG. 12C, the electronic device 1200 may detect a 180-degree counterclockwise rotation and may measure a rotation angle of a2 1204-2 that is 180. The rotation angle of a2 1204-2 may refer to an angle from the Xa1 axis before the rotation to an Xa2 axis that is changed by a2 after the rotation.

Subsequently, in operation 1104, the electronic device may generate and store a code based on the user authentication angle and the measured rotation angle. A code c may be generated to be the sum of the user authentication angle and the measured rotation angle. Referring to FIG. 12C, since the user authentication angle of b is 0 and the rotation angle of a2 1204-2 is 180, a code c2 is 180.

Figure 12D:
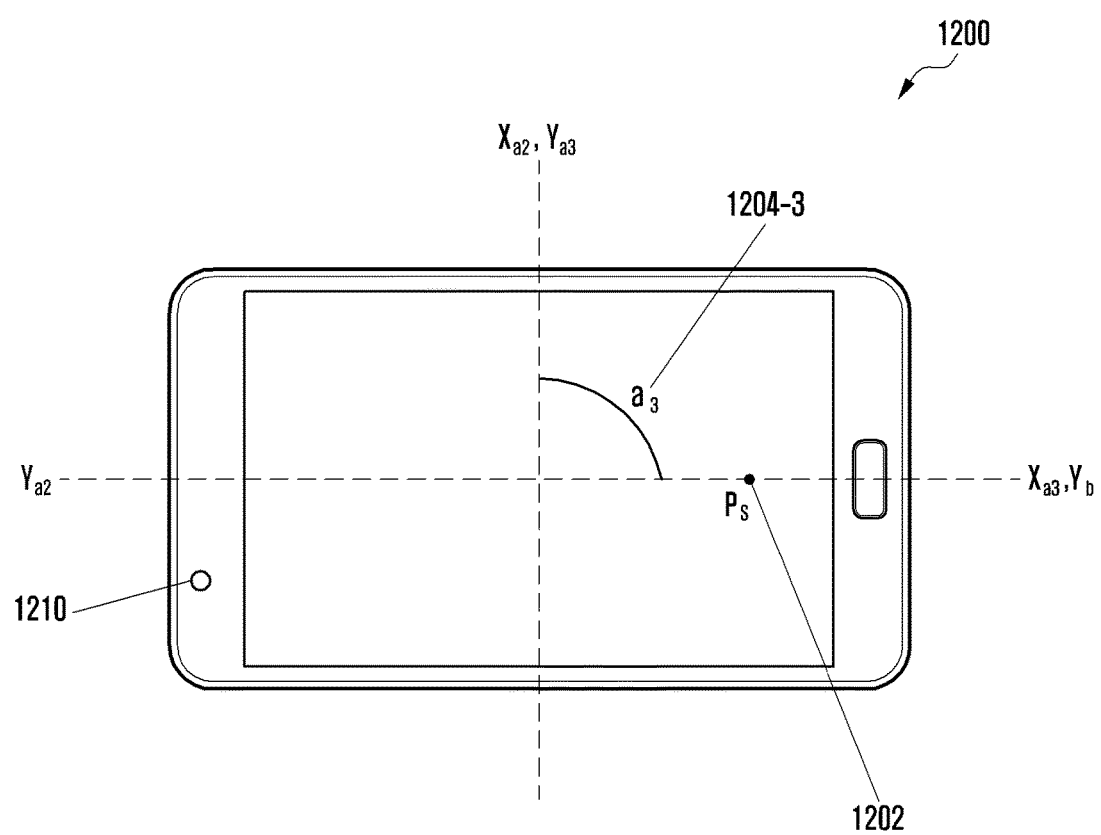

In operation 1105, the electronic device may determine whether the electronic device is further rotated, and may proceed back to operation 1103 if a rotation is detected. Referring to FIG. 12D, the electronic device 1200 may detect a 90-degree clockwise rotation and may measure a rotation angle of a3 1204-3 that is −90. The rotation angle of a3 1204-3 may refer to an angle from the Xa2 axis before the rotation to an Xa3 axis that is changed by a3 after the rotation.

Subsequently, in operation 1104, the electronic device may generate and store a code based on the user authentication angle and the measured rotation angle. A code c may be generated to be the sum of the user authentication angle and the measured rotation angle. Referring to FIG. 12D, since the user authentication angle of b is 0 and the rotation angle of a3 1204-3 is −90, a code c3 is −90.

In operation 1105, the electronic device may determine whether the electronic device is further rotated, and may proceed to operation 1106 if no rotation is detected.

In operation 1106, the electronic device may generate a code set using the generated codes in a code generation order. Referring to FIGS. 12A to 12D, the generated codes are c1, c2, and c3 according to the code generation order. A code set C may be a set of −90, 180, and −90.

In operation 1107, the electronic device may determine whether the generated code set C matches the authentication code set. In one embodiment, when the electronic device determines that user authentication is successful only when an input code set corresponds to a code set stored as the authentication code set in code values and value generating order, the electronic device may determine whether the values and orders of the codes in the sets match each other. The code set C generated according to the user authentication procedure illustrated in FIGS. 12A to 12D includes code values of −90, 180, and −90 in order, which do not match 90, 360, and 90 in the authentication code set.

When it is determined that the generated code set C matches the authentication code set in operation 1107, the electronic device proceeds to operation 1108, in which user authentication is successful, and thus may unlock the electronic device. When it is determined that the generated code set C does not match the authentication code set in operation 1107, the procedure may end. Thus, the electronic device detecting the user authentication procedure according to FIGS. 12A to 12D may determine that user authentication failed and may not unlock the electronic device.

FIGS. 10A to 10D are the same as FIGS. 12A to 12D in that the electronic devices detect three rotations in total and generate a code value based on each rotation. Further, the electronic devices detect and measure that the three rotations are performed in the same directions at the same angles. However, the resulting code sets are different, because the user gaze point Ps 1202 set when performing the user authentication procedure illustrated in FIGS. 12A to 12D is different from the user gaze point Ps (user gaze point Ps 1002 in FIG. 10) set when setting the authentication set code.

FIGS. 13A to 13D illustrate that an electronic device generates a code set according to various embodiments.

Figure 13A:
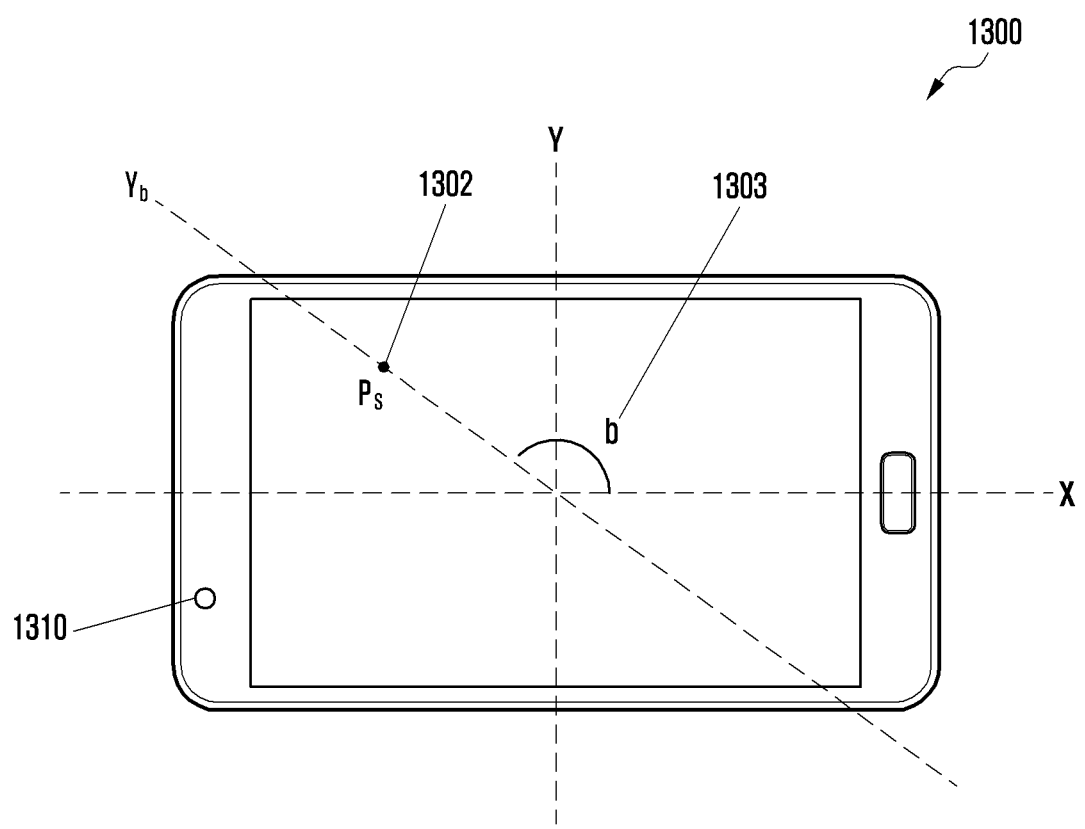
FIGS. 13A to 13D illustrate that an electronic device generates a code set according to various embodiments.

Referring to FIG. 13A, an electronic device 1300 may recognize that a user gazes at a specific point upon the request and may recognize and set the specific point as a user gaze point Ps 1302.

Referring to FIG. 13A, the electronic device 1300 may measure a user authentication angle of b 1303 that is an angle from an X axis to a Yb axis corresponding to the user gaze point Ps 1302. In one embodiment, the user authentication angle of b 1303 is 135 in FIG. 13A.

Figure 13B:
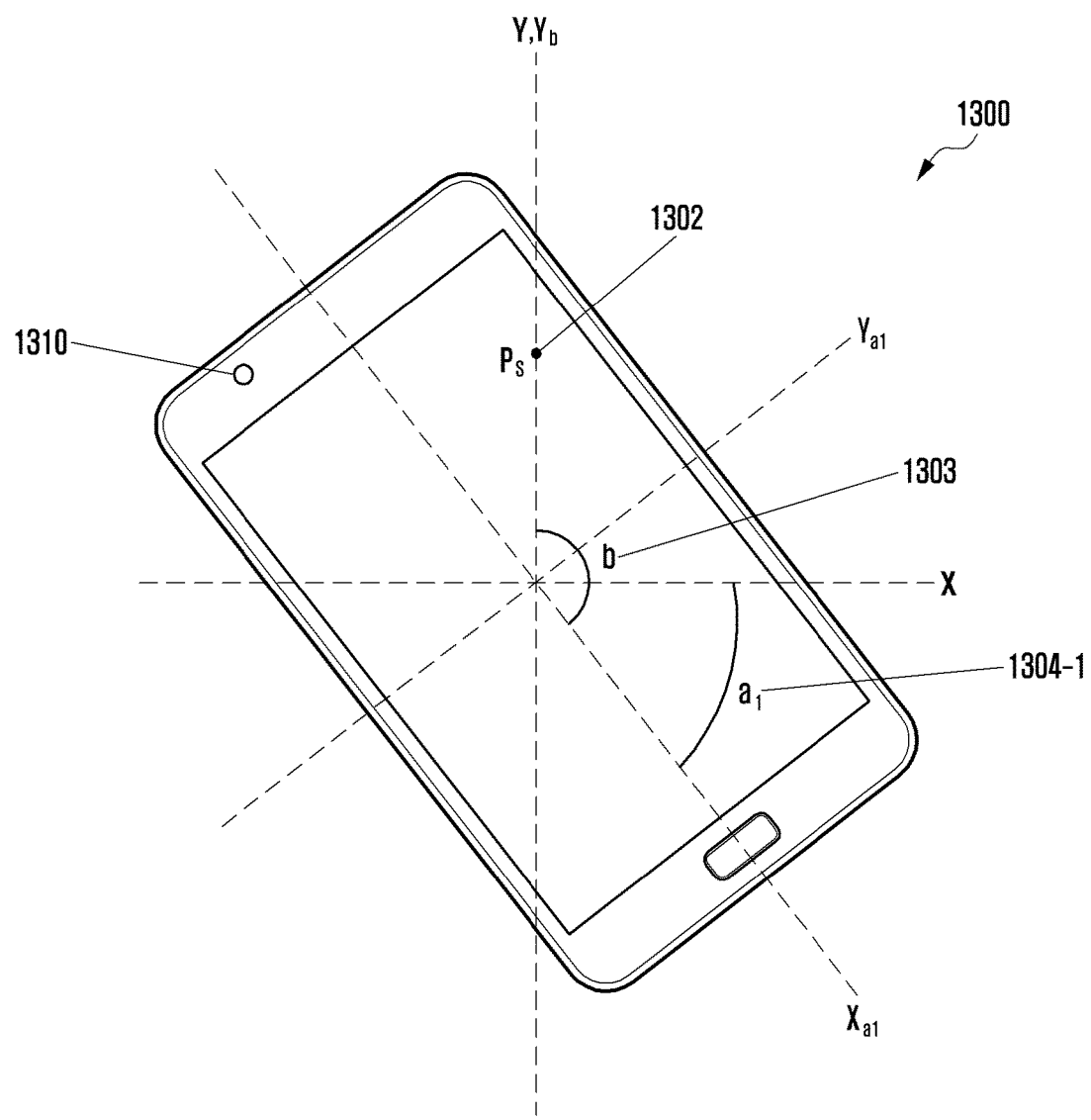

Referring to FIG. 13B, the electronic device 1300 may detect a 45-degree clockwise rotation and may measure a rotation angle of a1 1304-1 that is −45. The rotation angle of a1 1304-1 may refer to an angle from the X axis before the rotation to a Xa1 axis that is changed by a1 after the rotation. In the example illustrated in FIGS. 13A to 13D, since a plurality of rotations is detected, an axis changed first by a1 is represented by Xa1 in FIG. 13B to indicate a first rotation. That is, the rotation angle of a1 may refer to an angle from the X axis before the rotation to an Xa1 axis that is changed by a1 after the rotation.

Referring to FIG. 13B, since the user authentication angle of b 1303 is 135 and the rotation angle of a1 1304-1 is −45, a code c1 is 90.

Figure 13C:
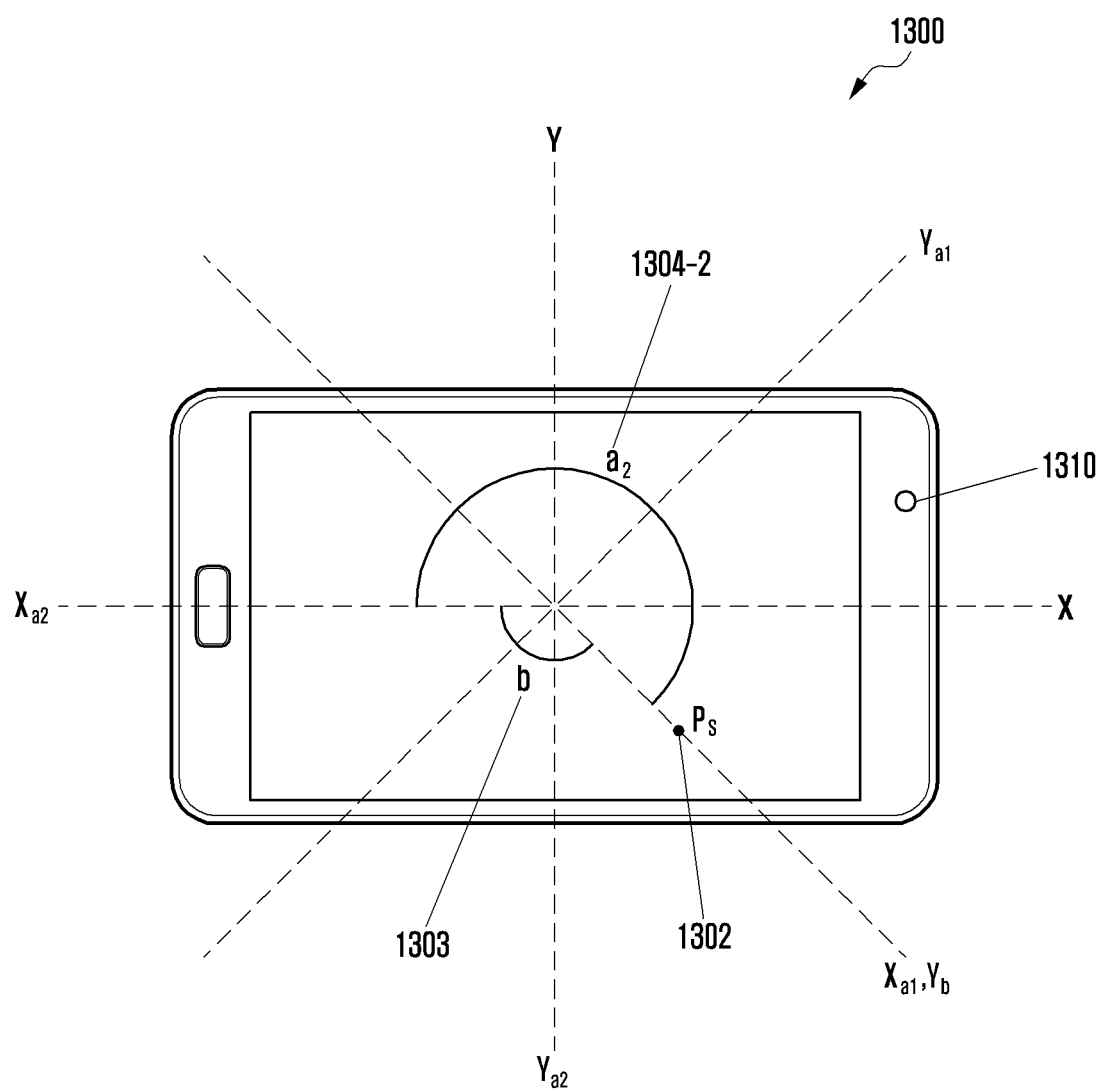

Referring to FIG. 13C, the electronic device 1300 may detect a 225-degree counterclockwise rotation and may measure a rotation angle of a2 1304-2 that is 225. The rotation angle of a2 1304-2 may refer to an angle from the Xa1 axis before the rotation to an Xa2 axis that is changed by a2 after the rotation. Since the user authentication angle of b 1303 is 135 and the rotation angle of a2 1304-2 is 225, a code c2 is 360.

Figure 13D:
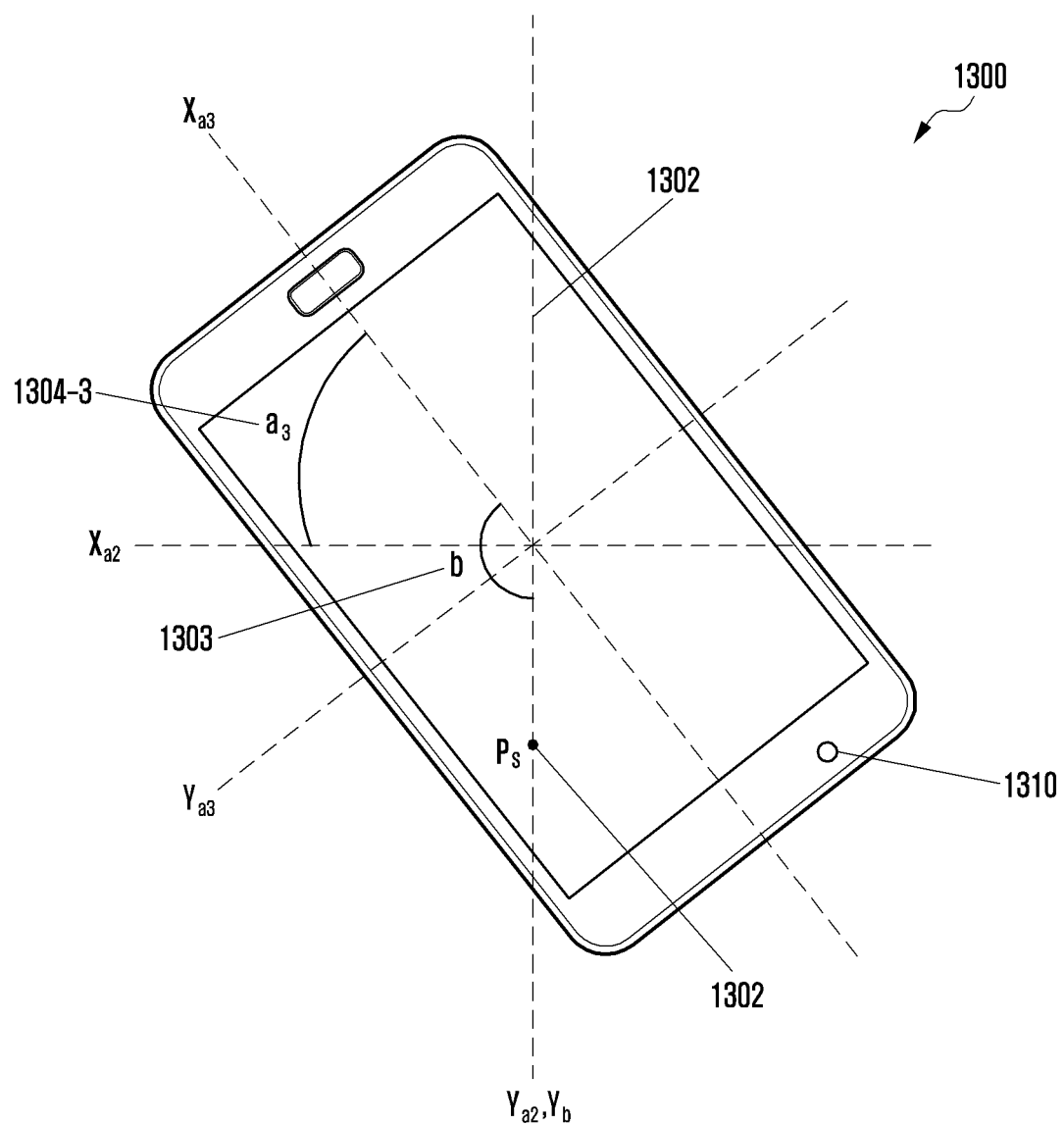

Referring to FIG. 13D, the electronic device 1300 may detect a 45-degree clockwise rotation and may measure a rotation angle of a3 1304-3 that is −45. The rotation angle of a3 1304-3 may refer to an angle from the Xa2 axis before the rotation to an Xa3 axis that is changed by a3 after the rotation. Since the user authentication angle of b 1303 is 135 and the rotation angle of a3 1304-3 is −45, a code c3 is 90.

Referring to FIGS. 13A to 13D, the generated codes are c1, c2, and c3 according to the code generation order. A code set C may be a set of 90, 360, and 90.

As illustrated in FIGS. 13A to 13D, if the electronic device detects that the electronic device is rotated, the generated code set may match the authentication code set. In FIGS. 13A to 13D, although the user gaze point, the rotation directions, and the rotation angles are different from those when the authentication code set is generated, the values in the generated code set and the order of the values are the same. If the electronic device is set to unlock the electronic device when the values of the code set and the order of the values match those of the authentication code set, the electronic may determine that user authentication is successful and may unlock the electronic device. In another embodiment, if the electronic device is set to determine that user authentication is successful when the code set matches the authentication code set in both code values and order of codes and all of the user gaze point, the rotation directions, and the rotation angles are the same as those for the authentication code set through a user authentication procedure, the electronic device may determine that user authentication failed in the case illustrated in FIGS. 13A to 13D.

An operation method of an electronic device according to various embodiments may include: detecting at least one rotation of the electronic device; calculating at least one rotation angle based on the at least one detected rotation; calculating at least one code based on the at least one calculated rotation angle and a user authentication angle calculated from a user gaze point that is set and storing the calculated code as an authentication code; and unlocking the electronic device when a code matching the stored authentication code is input.

According to various embodiments, the unlocking the electronic device may include: if an authentication code is pre-stored, determining that the at least one code matches the pre-stored authentication code; and unlocking the electronic device if its is determined that the at least one code matches the pre-stored authentication code.

According to various embodiments, the method may further include setting the user gaze point, wherein the setting may include recognizing a specific point at which a user gazes and setting the recognized point as the user gaze point.

According to various embodiments, the calculating and storing of the code may include: calculating respective rotation angles based on a plurality of detected rotations when the plurality of rotations is detected; calculating codes based on the respective calculated rotation angles and the user authentication angle; and generating and storing a code set of the calculated codes, and the method may further include unlocking the electronic device when a code set matching the stored code set is input.

According to various embodiments, the generating and storing of the code set may include generating and storing a code set of the calculated codes in an order that the rotation angles are calculated.

According to various embodiments, the setting of the user gaze point may include additionally setting a user gaze point whenever a plurality of rotations is detected.

According to various embodiments, the method may include calculating codes based on respective rotation angles based on the plurality of detected rotations and user authentication angles calculated from respective user gaze points additionally set according to the rotations, and generating and storing a code set of the codes.

According to various embodiments, the generating and storing of the code set may include generating and storing a code set of the calculated codes in an order that the rotation angles are calculated.

According to various embodiments, the method may further include displaying a graphic gauge to indicate a rotation direction and a rotation angle of the electronic device.

According to various embodiments, the detecting of the rotation may include detecting at least one rotation by recognizing at least one of a touch and a drag to rotate the graphic gauge.

Figure 14:
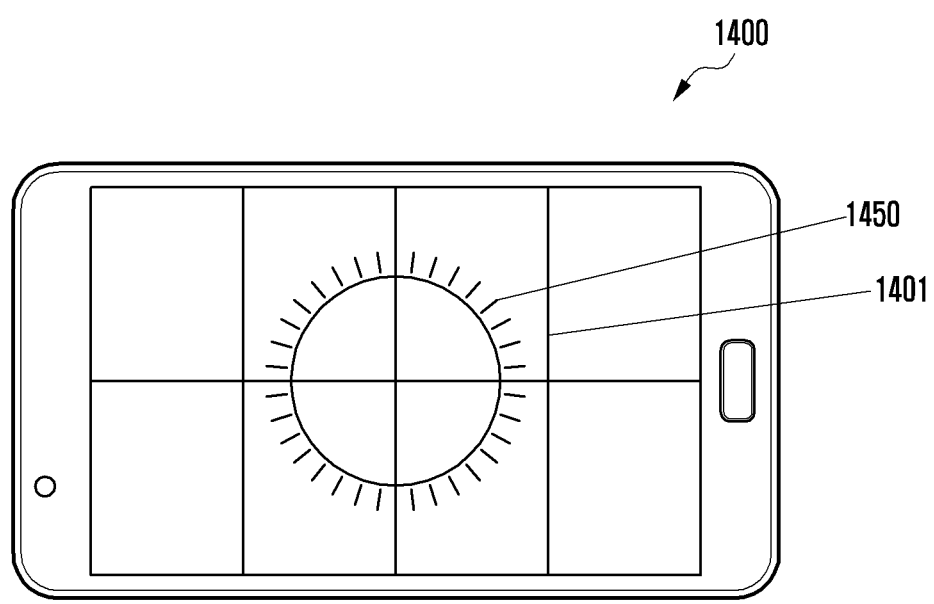
FIG. 14 illustrates that an electronic device sets a user gaze point according to various embodiments.

FIG. 14 illustrates that an electronic device sets a user gaze point according to various embodiments.

Referring to FIG. 14, an electronic device 1400 may display auxiliary lines 1401 to indicate eight rectangles on a screen so that a user sets a user gaze point. Further, although the auxiliary lines 1401 are not displayed, if there is a point in the same rectangle, the electronic device 1400 may determine the point as a user gaze point even though the user gazes at a different point. In addition, the electronic device 1400 may display a graphic gauge 1450 so that the user receives a feedback on a rotation extent of the electronic device. The graphic gauge 1450 may be intended to display a quantized rotation of the electronic device 1400. The electronic device 1400 may display the graphic gauge 1450 with 36 points such that an interval between points of the graphic gauge 1450 indicates 10 degrees.

Although a few embodiments have been shown and described, it would be appreciated by those skilled in the art that changes may be made in exemplary embodiments without departing from the principles and spirit of the disclosure, the scope of which is defined in the claims and their equivalents.

What is claimed is:

1. A method for user authentication in an electronic device, comprising:
   recognizing a point at which a user gazes and setting the recognized point as a user gaze point;
   obtaining a user authentication angle corresponding to the user gaze point;
   detecting at least one rotation of the electronic device;
   obtaining at least one rotation angle based on the detected at least one rotation;
   obtaining at least one code based on the at least one rotation angle and the user authentication angle, and storing the at least one code as an authentication code; and
   unlocking the electronic device in response to an input of a code matching the authentication code.

2. The method of claim 1, wherein the unlocking the electronic device comprises:
   if the authentication code is pre-stored, determining that the at least one code matches the pre-stored authentication code; and
   unlocking the electronic device if it is determined that the at least one code matches the pre-stored authentication code.

3. The method of claim 1, wherein the obtaining and storing the code comprises:
   obtaining respective rotation angles based on a plurality of rotations of the electronic device that are detected;
   obtaining codes based on the respective rotation angles and the user authentication angle; and
   generating and storing a code set of the codes, and
   the method further comprises unlocking the electronic device in response to an input of a code set matching the stored code set.

4. The method of claim 3, wherein the generating and storing the code set comprises generating and storing the code set of the codes in an order in which the respective rotation angles are obtained.

5. The method of claim 1, wherein the setting the user gaze point comprises setting a second user gaze point in response to a plurality of rotations of the electronic device being detected.

6. The method of claim 5, further comprising obtaining codes based on respective rotation angles obtained based on the detected plurality of rotations and user authentication angles, the user authentication angles being obtained from the user gaze point and the second user gaze point, and generating and storing a code set of the codes.

7. The method of claim 6, wherein the generating and storing the code set comprises generating and storing the code set of the codes in an order in which the respective rotation angles are obtained.

8. The method of claim 1, further comprising displaying a graphic gauge to indicate a rotation direction and a rotation angle of the electronic device.

9. The method of claim 8, wherein the detecting the at least one rotation comprises detecting the at least one rotation by recognizing at least one of a touch and a drag to rotate the graphic gauge.

10. An electronic device comprising:
    a camera configured to recognize a gaze of a user;
    a sensor unit configured to detect at least one rotation of the electronic device;
    a processor configured to recognize a point at which a user gazes and to set the recognized point as a user gaze point, configured to obtain a user authentication angle corresponding to the user gaze point, configured to obtain at least one rotation angle based on the detected at least one rotation, configured to obtain at least one code based on the at least one rotation angle and the user authentication angle, configured to store the at least one code as an authentication code, and configured to unlock the electronic device in response to an input of a code matching the authentication code; and
    a storage unit configured to store the authentication code.

11. The electronic device of claim 10, wherein the processor is further configured to determine, if the authentication code is pre-stored, that the at least one code matches the pre-stored authentication code, and unlock the electronic device if it is determined that the at least one code matches the pre-stored authentication code.

12. The electronic device of claim 10, wherein the processor is further configured to obtain respective rotation angles based on a plurality of rotations of the electronic device that are detected, obtain codes based on the respective rotation angles and the user authentication angle, configured to generate and store a code set of the codes, and configured to unlock the electronic device in response to an input of a code set matching the stored code set.

13. The electronic device of claim 12, wherein the processor is further configured to generate and store the code set of the codes in an order in which the respective rotation angles are obtained.

14. The electronic device of claim 10, wherein the processor is further configured to set a second user gaze point in response to a plurality of rotations of the electronic device being detected.

15. The electronic device of claim 14, wherein the processor is further configured to obtain codes based on respective rotation angles based on the detected plurality of rotations and user authentication angles, the user authentication angles being obtained from the user gaze point and the second user gaze point, and configured to generate and store a code set of the codes.

16. The electronic device of claim 15, wherein the processor is further configured to generate and store the code set of the codes in an order in which the respective rotation angles are obtained.

17. The electronic device of claim 10, further comprising a display configured to display a graphic gauge to indicate a rotation direction and a rotation angle of the electronic device.

18. The electronic device of claim 17, wherein the processor is further configured to detect the at least one rotation by recognizing at least one of a touch and a drag to rotate the graphic gauge.

* * * * *